(12) United States Patent
Izawa

(10) Patent No.: US 8,358,344 B2
(45) Date of Patent: Jan. 22, 2013

(54) PHOTOGRAPHING APPARATUS AND METHOD

(75) Inventor: Katsutoshi Izawa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 727 days.

(21) Appl. No.: 12/544,594

(22) Filed: Aug. 20, 2009

(65) Prior Publication Data
US 2010/0053323 A1 Mar. 4, 2010

(30) Foreign Application Priority Data

Sep. 3, 2008 (JP) ................................. 2008-226217

(51) Int. Cl.
*G06K 9/00* (2006.01)
(52) U.S. Cl. ......................... 348/152; 348/169; 382/103
(58) Field of Classification Search .................. 348/335, 348/345, 350, 152, 169; 382/103
See application file for complete search history.

(56) References Cited

U.S. PATENT DOCUMENTS

| 6,081,660 | A | * | 6/2000 | Macleod et al. | .................. 703/2 |
| 7,054,850 | B2 | * | 5/2006 | Matsugu | ......................... 706/48 |
| 7,289,726 | B2 | | 10/2007 | Moriya et al. | |
| 7,565,074 | B2 | * | 7/2009 | Nakahara | ...................... 396/125 |
| 7,693,311 | B2 | * | 4/2010 | Steinberg et al. | ............. 382/118 |
| 8,154,647 | B2 | * | 4/2012 | Ferren | ........................... 348/335 |
| 2003/0156138 | A1 | * | 8/2003 | Vronay et al. | ................. 345/772 |
| 2008/0205866 | A1 | | 8/2008 | Sakamoto | |

FOREIGN PATENT DOCUMENTS

| JP | 2003-78792 A | 3/2003 |
| JP | 2005-283931 A | 10/2005 |
| JP | 2006-33367 A | 2/2006 |
| JP | 2008-182485 A | 8/2008 |

* cited by examiner

*Primary Examiner* — Khanh Dinh

(74) *Attorney, Agent, or Firm* — Birch, Stewart, Kolasch & Birch, LLP

(57) ABSTRACT

A photographing apparatus includes a photographing lens; an image acquisition device for acquiring an image of a subject; a recording device for recording the image acquired in accordance with an instruction of actual photographing in a recording medium; a visual line guiding device for guiding a visual line of the subject to the photographing lens; and an activation control device for activating the visual line guiding device according to a photographing situation which is determined based on the image acquired by the image acquisition device.

22 Claims, 11 Drawing Sheets

PHOTOGRAPHING APPARATUS AND METHOD

BACKGROUND OF THE INVENTION

1. Field of the Invention

The present invention relates to a photographing apparatus and method, and particularly to a photographing apparatus and method for photographing a photographic subject by guiding a visual line of the photographic subject to a photographing lens by a visual line guiding device.

2. Description of the Related Art

In general, in photographing with persons and pets as photographic subjects, the visual lines of the subjects are preferably directed to photographing lenses (so-called a situation that a visual line of a photographic subject faces into a camera directly).

Thus, Japanese Patent Application Laid-Open No. 2003-78792, Japanese Patent Application Laid-Open No. 2005-283931 and Japanese Patent Application Laid-Open No. 2006-33367 each propose guiding the visual line of a photographic subject to the photographing lens by performing an operation of calling attention of the photographic subject on the camera side at the time of photographing, for example, the operations of emitting light toward the photographic subject and generating sound.

SUMMARY OF THE INVENTION

Incidentally, in such a photographing situation that many people photograph a small number of photographic subjects, it is difficult to direct the visual line of the subjects to the photographing lens.

Accordingly, in such a photographing situation, it is preferable to perform an operation of guiding the visual lines of the photographic subjects to the photographing lens on the camera side as in Japanese Patent Application Laid-Open No. 2003-78792, Japanese Patent Application Laid-Open No. 2005-283931 and Japanese Patent Application Laid-Open No. 2006-33367.

However, in the methods of Japanese Patent Application Laid-Open No. 2003-78792, Japanese Patent Application Laid-Open No. 2005-283931 and Japanese Patent Application Laid-Open No. 2006-33367, it is impossible to perform an operation of properly guiding the visual lines of the photographic subjects to the photographing lenses because the photographing situations cannot be discriminated.

The present invention is made in view of the above circumstances, and has an object to provide a photographing apparatus and method capable of photographing a favorable image by automatically detecting a photographing situation where many people photograph a small number of photographic subjects, and properly guiding visual lines of the photographic subjects.

In order to attain the above-described object, the first aspect of the invention provides a photographing apparatus including: a photographing lens; an image acquisition device for acquiring an image of a subject; a recording device for recording the image acquired in accordance with an instruction of actual photographing in a recording medium; a visual line guiding device for guiding a visual line of the subject to the photographing lens; a detection device for making detection of at least one of a ratio of a face of the subject in an image, an orientation of the face of the subject, a distance to the subject from the photographing apparatus, a moving amount of the subject, expression of the face of the subject, and a change amount of brightness of the subject in a predetermined time period, based on the image acquired by the image acquisition device; and an activation control device for activating the visual line guiding device based on a result of the detection made by the detection device.

The second aspect of the invention provides the photographing apparatus according to the first aspect, wherein the activation control device activates the visual line guiding device when the at least one of requirements is satisfied, said requirements including the first requirement that the ratio of the face of the subject in the image is greater than or equal to a first threshold value, the second requirement that the orientation of the face of the subject is to a front of the photographing apparatus, the third requirement that the distance from the photographing apparatus to the subject is within a predetermined range, the fourth requirement that the moving amount of the subject is less than or equal to a second threshold value, the fifth requirement that the expression of the face of the subject is a smiling face, and the sixth requirement that the change amount of the brightness of the subject in the predetermined time period is greater than or equal to a third threshold value.

The third aspect of the invention provides the photographing apparatus according to the first aspect, wherein the detection device detects the ratio of the face of the subject in the image, the orientation of the face of the subject, the distance to the subject from the photographing apparatus, the moving amount of the subject, the expression of the face of the subject, and the change amount of brightness of the subject in the predetermined time period, and the activation control device activates the visual line guiding device when all of requirements is satisfied, said requirements including the first requirement that the ratio of the face of the subject in the image is greater than or equal to a first threshold value, the second requirement that the orientation of the face of the subject is to a front of the photographing apparatus, the third requirement that the distance from the photographing apparatus to the subject is within a predetermined range, the fourth requirement that the moving amount of the subject is less than or equal to a second threshold value, the fifth requirement that the expression of the face of the subject is a smiling face, and the sixth requirement that the change amount of the brightness of the subject in the predetermined time period is greater than or equal to a third threshold value.

According to the present invention, at least one of the ratio of the face of the subject in the image, the orientation of the face of the subject, the distance to the subject, the moving amount of the subject, the expression of the face of the subject, and the change amount of the brightness of the subject in the predetermined time period is detected based on the image data acquired by the image acquisition device, and whether the ratio of the face of the subject in the image is greater than or equal to a first threshold value, whether the orientation of the face of the subject is to a front (including substantially a front), whether the distance to the subject is within a predetermined range, whether the moving amount of the subject is a second threshold value or less, whether the expression of the face of the subject is a smiling face, and whether the change amount of the brightness of the subject in the predetermined time period is a third threshold value or less are determined in accordance with the detection result. When all determined requirements are satisfied, the visual line guiding device is activated. More specifically, when the ratio of the face of the subject in the image is large, when the orientation of the face of the subject is to the front, when the distance to the subject is short, when the moving amount of the subject is small, when expression of the face of the subject is a smile, and when the change amount of the brightness of the subject within the predetermined time period is large due to flash photographing or the like, the photographing situation can be considered as the photographing situation where many people photograph a small number of subjects. Therefore, when the above mentioned requirements are satisfied, the visual line guiding device is automatically activated, and the visual line of the subject is guided to the photographing lens. Thereby, in the photographing situation where many people photograph a small number of subjects, such a photographing situation is automatically detected, and the visual line guiding device can be automatically activated. Thus, a favorable image can be easily photographed under a situation, so-called, that a visual line of a photographic subject faces into a camera directly. It is possible to determine the photographing situation based on one of the determination items. However, the photographing situation where many people photograph a small number of subjects can be determined with higher precision by combining a plurality of determination items. Further, the subjects include not only persons, but also include animals such as pets.

In order to attain the above described object, the fourth aspect of the invention provides a photographing apparatus comprising: a photographing lens; an image acquisition device for acquiring an image of a subject; a recording device for recording the image acquired in accordance with an instruction of actual photographing in a recording medium; a visual line guiding device for guiding a visual line of the subject to the photographing lens; a shutter sound detection device for detecting a shutter sound occurring around the photographing apparatus; and an activation control device for activating the visual line guiding device when a number of the shutter sounds detected by the shutter sound detection device within a predetermined time period is greater than or equal to a predetermined number.

According to the present invention, when the shutter sounds in the surroundings are detected, and a predetermined number or more of shutter sounds are detected in a predetermined time period, the visual line guiding device is automatically activated. More specifically, the photographing situation where a large number of shutter sounds occur in the surroundings is considered as the photographing situation where many people photograph a small number of subjects. Therefore, in such a case, the visual line guiding device is automatically activated, and the visual line of the subject is guided to the photographing lens. Thereby, in a photographing situation where many people photograph a small number of subjects, such a photographing situation is automatically detected, and the visual line guiding device can be automatically activated. Thus, a favorable image can be easily photographed under a situation, so-called, that a visual line of a photographic subject faces into a camera directly.

In order to attain the above described object, the fifth aspect of the invention provides a photographing apparatus including: a photographing lens; an image acquisition device for acquiring an image of a subject; a recording device for recording the image acquired in accordance with an instruction of actual photographing in a recording medium; a visual line guiding device for guiding a visual line of the subject to the photographing lens; a specific sound detection device for detecting a specific sound occurring around the photographing apparatus; and an activation control device for activating the visual line guiding device when the specific sound is detected by the specific sound detection device.

According to the present invention, when specific sounds occurring in the surroundings (sounds which guide a visual line, for example, "Look this way", "Now, I'm going to take a picture", or the like) are detected, and when a predetermined number or more of the sounds are detected within a predetermined time period, the visual line guiding device is automatically activated. More specifically, the photographing situation where a number of such sounds are made in the surroundings is considered as the photographing situation where many people photograph a small number of subjects. Therefore, in such a case, the visual line guiding device is automatically activated, and the visual line of the subject is guided to the photographing lens. Thereby, in a photographing situation where many people photograph a small number of subjects, such a photographing situation is automatically detected, and the visual line guiding device can be automatically activated. Thus, a favorable image can be easily photographed under a situation, so-called, that a visual line of a photographic subject faces into a camera directly.

In order to attain the above described object, the sixth to eighth aspect of the invention provides the photographing apparatus according to the first, fourth or fifth aspect respectively, further including: a competition detection device for detecting the activation of a visual line guiding device comprised by another photographing apparatus, wherein the activation control device stops activation of the visual line guiding device of the photographing apparatus when the competition detection device detects the activation of the visual line guiding device comprised by another photographing apparatus.

According to the present invention, it is detected that the visual line guiding device of another photographing apparatus is activated, and when the visual line guiding device of another photographing apparatus is activated, activation of the visual line guiding device is stopped. Thereby, confusion of the subjects due to competition of the visual line guidance (confusing which direction the visual lines should be directed) can be avoided.

In order to attain the above described object, the ninth to eleventh aspect of the invention provides the photographing apparatus according to the sixth to eighth aspect respectively, wherein the visual line guiding device guides the visual line of the subject to the photographing lens by emitting a light of a predetermined color toward the subject, and the competition detection device detects a hue of the image acquired by the image acquisition device, and detects the activation of the visual line guiding device comprised by another photographing apparatus based on the hue of the image.

According to the present invention, the visual line of the subject is guided by emitting light of a predetermined color. In this case, if the hue of the image data acquired by the image acquisition device is detected, it can be detected whether or not the visual line guiding device of another photographing apparatus is activated. More specifically, for example, when the visual line of the subject is guided by emitting blue light, the image is tinted with blue by the blue light being projected. Therefore, by detecting the hue of the image, it can be detected whether or not the other visual line guiding devices are activated. Thereby, a detection device does not have to be additionally provided, and the configuration of the entire apparatus can be simplified.

In order to attain the above described object, the twelfth aspect of the invention provides a photographing method for photographing an image of a subject by a photographing apparatus, including steps of: performing photographing preparation in accordance with an instruction of the photographing preparation; acquiring the image of the subject; making detection of at least one of a ratio of a face of the subject in the image, an orientation of the face of the subject, a distance to the subject from the photographing apparatus, a moving amount of the subject, expression of the face of the subject, and a change amount of brightness of the subject in a predetermined time period, based on the image acquired after receiving the instruction of the photographing preparation, in the step of acquiring; activating a visual line guiding device for guiding a visual line of the subject to a photographing lens comprised by the photographing apparatus based on a result of the detection; acquiring the image in accordance with an instruction of actual photographing while the visual line guiding device is activated; and recording the image acquired in accordance with the instruction of the actual photographing in a recording medium.

The thirteenth aspect of the invention provides the photographing method according to the twelfth aspect, wherein in the step of activating, the visual line guiding device is activated when the at least one of requirements is satisfied, said requirements including the first requirement that the ratio of the face of the subject in the image is greater than or equal to a first threshold value, the second requirement that the orientation of the face of the subject is to a front of the photographing apparatus, the third requirement that the distance from the photographing apparatus to the subject is within a predetermined range, the fourth requirement that the moving amount of the subject is less than or equal to a second threshold value, the fifth requirement that the expression of the face of the subject is a smiling face, and the sixth requirement that the change amount of the brightness of the subject in the predetermined time period is greater than or equal to a third threshold value.

The fourteenth aspect of the invention provides the photographing apparatus according to the twelfth aspect, wherein in the step of making detection, the ratio of the face of the subject in the image, the orientation of the face of the subject, the distance to the subject from the photographing apparatus, the moving amount of the subject, the expression of the face of the subject, and the change amount of brightness of the subject in the predetermined time period are detected, and in the step of activating, the visual line guiding device is activated when all of requirements is satisfied, said requirements including the first requirement that the ratio of the face of the subject in the image is greater than or equal to a first threshold value, the second requirement that the orientation of the face of the subject is to a front of the photographing apparatus, the third requirement that the distance from the photographing apparatus to the subject is within a predetermined range, the fourth requirement that the moving amount of the subject is less than or equal to a second threshold value, the fifth requirement that the expression of the face of the subject is a smiling face, and the sixth requirement that the change amount of the brightness of the subject in the predetermined time period is greater than or equal to a third threshold value.

According to the present invention, when the instruction of photographing preparation is received, at least one of the ratio of the face of the subject in the image (a screen), the orientation of the face of the subject, the distance to the subject, the moving amount of the subject, the expression of the face of the subject, and the change amount of the brightness of the subject in the predetermined time period is detected based on the image data acquired by the image acquisition device, and whether the ratio of the face of the subject in the image is greater than or equal to a first threshold value, whether the orientation of the face of the subject is to a front, whether the distance to the subject is within a predetermined range, whether the moving amount of the subject is a second threshold value or less, whether the expression of the face of the subject is a smiling face, and whether the change amount of the brightness of the subject in the predetermined time period is a third threshold value or less are determined in accordance with the detection result. When all of the above mentioned requirements are satisfied, the visual line guiding device is activated. Thereby, in a photographing situation where many people photograph a small number of subjects, such a photographing situation is automatically detected, and the visual line guiding device can be automatically activated. Thus, a favorable image can be easily photographed under a situation, so-called, that a visual line of a photographic subject faces into a camera directly.

In order to attain the above described object, the fifteenth aspect of the invention provides a photographing method for photographing an image of a subject by a photographing apparatus, including steps of: performing photographing preparation in accordance with an instruction of the photographing preparation; acquiring the image of the subject; detecting a shutter sound occurring around the photographing apparatus; activating a visual line guiding device for guiding a visual line of the subject to a photographing lens comprised by the photographing apparatus when a number of the shutter sounds detected within a predetermined time period is greater than or equal to a predetermined number; acquiring the image in accordance with an instruction of actual photographing while the visual line guiding device is activated; and recording the image acquired in accordance with the instruction of the actual photographing in a recording medium.

According to the present invention, when the shutter sounds in the surroundings are detected, and a predetermined number or more of the shutter sounds are detected in a predetermined time period, the visual line guiding device is automatically activated. Thereby, in a photographing situation where many people photograph a small number of subjects, such a photographing situation is automatically detected, and the visual line guiding device can be automatically activated. Thus, a favorable image can be easily photographed under a situation, so-called, that a visual line of a photographic subject faces into a camera directly.

In order to attain the above described object, the sixteenth aspect of the invention provides a photographing method for photographing an image of a subject by a photographing apparatus, including steps of: performing photographing preparation in accordance with an instruction of the photographing preparation; acquiring the image of the subject; detecting a specific sound occurring around the photographing apparatus; activating a visual line guiding device for guiding a visual line of the subject to a photographing lens comprised by the photographing apparatus when the specific sound is detected; acquiring the image in accordance with an instruction of actual photographing while the visual line guiding device is activated; and recording the image acquired in accordance with the instruction of the actual photographing in a recording medium.

According to the present invention, when the specific sounds occurring in the surroundings (sounds which guides the visual line) are detected, and a predetermined number or more of the shutter sounds are detected in a predetermined time period, the visual line guiding device is automatically activated. Thereby, in a photographing situation where many people photograph a small number of subjects, such a photographing situation is automatically detected, and the visual line guiding device can be automatically activated. Thus, a favorable image can be easily photographed under a situation, so-called, that a visual line of a photographic subject faces into a camera directly.

In order to attain the above described object, the seventeenth to nineteenth aspect of the invention provides the photographing method according to twelfth, fifteenth and sixteenth aspect respectively, further including steps of:

detecting the activation of a visual line guiding device comprised by another photographing apparatus before activating the visual line guiding device of the photographing apparatus; and stopping activation of the visual line guiding device of the photographing apparatus when the activation of the visual line guiding device comprised by another photographing apparatus is detected, According to the present invention, when it is detected that the visual line guiding device of another photographing apparatus is activated, and the visual line guiding device of another photographing apparatus is activated, activation of the visual line guiding device is stopped. Thereby, confusion of the subject due to competition of visual line guidance can be avoided.

In order to attain the above described object, the twentieth to twenty-second aspect of the invention provides the photographing method according to the seventeenth to nineteenth aspect, wherein in the step of activating, a light of a predetermined color is emitted toward the subject by the visual line guiding device to guide the visual line of the subject to the photographing lens, and in the step of detecting the activation, a hue of the acquired image is detected to detect the activation of the visual line guiding device comprised by another photographing apparatus based on the hue of the image.

According to the present invention, the visual line of the subject is guided by emitting a light of a predetermined color. Further, the hue of the acquired image data is detected, and it is detected whether or not the visual line guiding device of another photographing apparatus is activated. Thereby, a detection device does not have to be additionally provided, and the configuration of the entire apparatus can be simplified.

According to the present invention, the photographing situation where many people photograph a small number of photographic subjects is automatically detected, visual lines of the photographic subjects are properly guided, and a favorable image photographed at, so-called, a photographing situation that a visual line of a photographic subject faces into a camera directly can be easily photographed.

DETAILED DESCRIPTION OF THE PREFERRED EMBODIMENTS

Hereinafter, preferred embodiments of a photographing apparatus and method according to the present invention will be described with reference to the accompanying drawings.
[First Embodiment]
<Apparatus Configuration>

Figure 1:
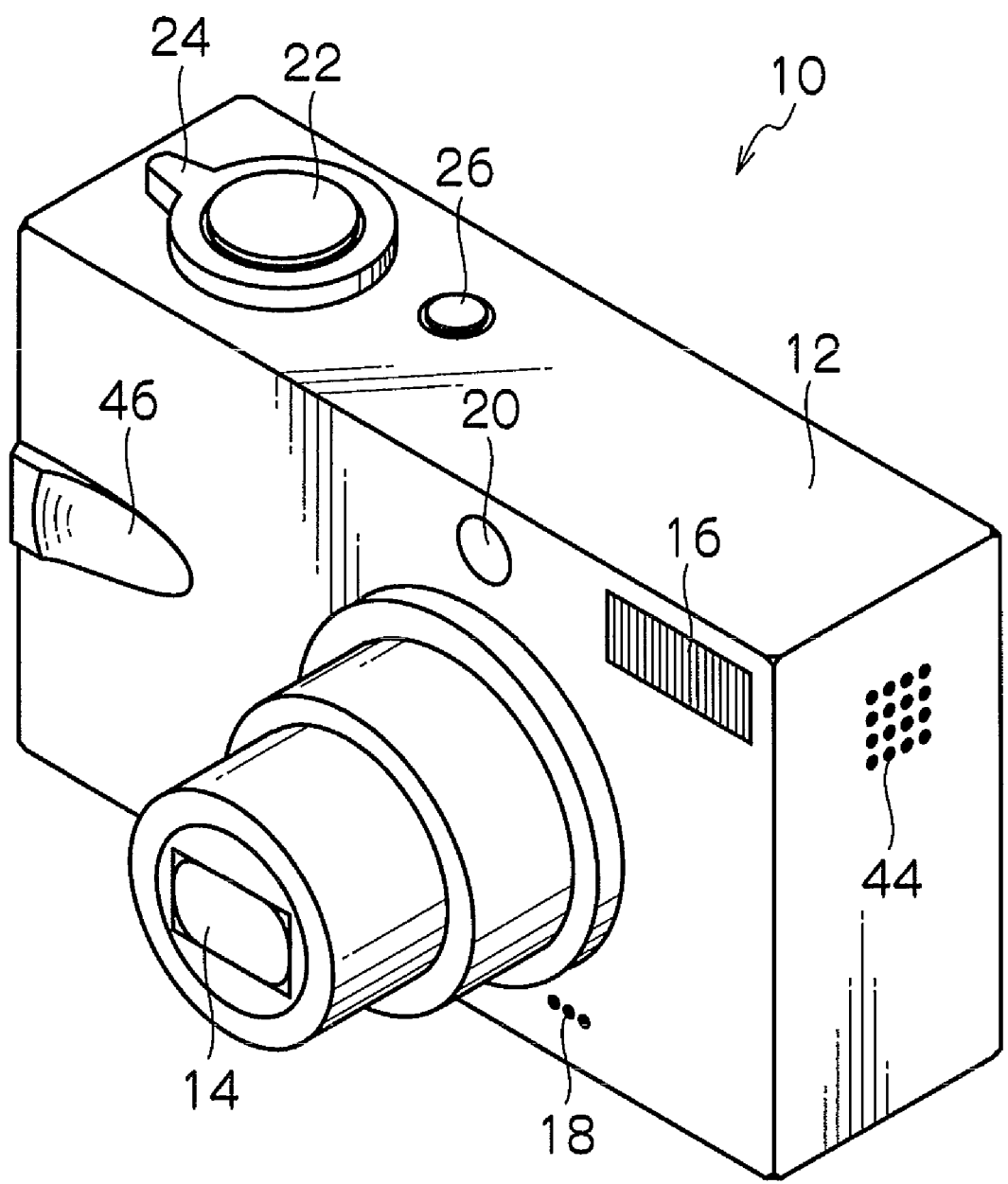
FIG. 1 is a front perspective view showing an external configuration of a digital camera.
Figure 2:
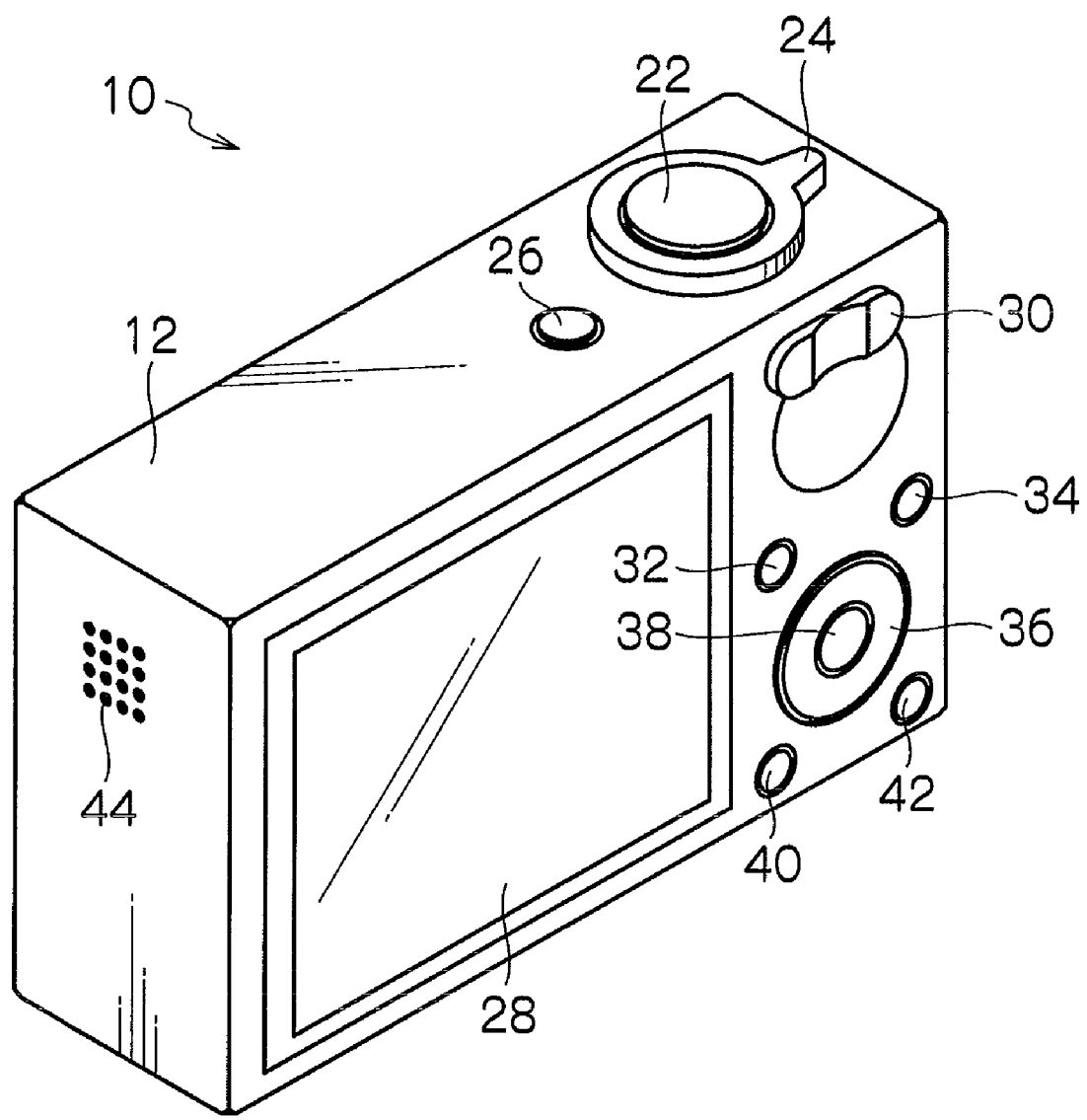
FIG. 2 is a rear perspective view showing the external configuration of the digital camera.

FIGS. 1 and 2 are respectively a front perspective view and a rear perspective view showing an external configuration of a digital camera to which the present invention is applied.

As shown in the FIGS. 1 and 2, a digital camera 10 is configured as a so-called compact camera, and a camera body 12 thereof is formed into the shape of a rectangular parallelepiped box with a small thickness.

As shown in FIG. 1, a photographing lens 14, a flash 16, a microphone 18 and a visual line guiding lamp 20 are provided on a front surface of the camera body 12, and a shutter button 22, a mode lever 24 and a power supply button 26 are provided on a top surface.

Meanwhile, as shown in FIG. 2, a monitor 28, a zoom button 30, a reproduction button 32, a function button 34, a cross button 36, a MENU button 38, an OK button 40 and a cancel button 42 are provided on a rear surface of the camera body 12, and a speaker 44 is provided on a lateral surface.

Further, a tripod screw hole, a USB terminal, a power supply terminal, an openable and closable battery cover and the like are provided on a bottom surface of the camera body 12, though not illustrated, and a battery housing chamber for housing a battery and a memory card slot to which a memory card is attached are provided inside the battery cover.

The photographing lens 14 includes a folding type zoom lens. When the power supply of the digital camera 10 is turned on, the photographing lens 14 is drawn out from the camera body 12. A zoom mechanism and a folding mechanism of the photographing lens 14 are known techniques, and therefore, description of the concrete configurations of them will be omitted here.

The flash 16 includes a xenon tube, and emits light to a photographic subject in a dark scene, at a time of photographing against the light or the like.

The microphone 18 gathers ambient sounds. At the time of photographing a moving image, the sounds gathered by the microphone 18 are recorded with a video.

The visual line guiding lamp 20 is an LED lamp of a blue color, and emits light (including blinking) toward the photographic subject while guiding a visual line of the photographic subject. By causing the visual line guiding lamp 20 to emit light at the time of photographing, attention of the photographic subject is called, and the visual line of the photographic subject is guided to the photographing lens 14.

The shutter button 22 is an operation device which gives instructions of photographing preparation and actual photographing, and is configured by a two-stage stroke type push button composed of a so-called "half press" and "full press". When the shutter button 22 is half-pressed, the digital camera 10 performs photographing preparation, that is, each processing of AE (Automatic Exposure) and AF (Auto Focus). When the shutter button 22 is fully pressed, the digital camera 10 performs actual photographing, that is, processing of photographing and recording an image for recording.

The shutter button 22 is disposed at a position (position slightly near to a left end of the top surface) which a forefinger of a photographer's hand touches spontaneously when the photographer (the user) grasps the camera body 12 with the user's hand. The photographer puts the middle finger of the hand on the grip 46 disposed at the left end portion of the front surface of the camera body 12, and grips the camera body 12 with the right hand.

The visual line guiding lamp 20 is disposed at a position which fingers of the hand grasping the camera body 12 does not touch. In this example, the visual line guiding lamp 20 is disposed at an upper position from the photographing lens 14, and projects blue light forward in parallel with the photographing direction (parallel with the photographing optical axis).

The mode lever 24 is an operating device for setting a photographing mode, turns around the shutter button 22 and is provided to be settable to predetermined positions, that is, "SP position", "AUTO position", "M position" and "moving image position". The digital camera 10 is set to "scene program photographing mode" by setting the mode lever 24 to "SP position", and is set to a mode for performing exposure control and photographing control corresponding to a photographing scene. Further, by setting the mode lever 24 to "AUTO position", the digital camera 10 is set to "auto photographing mode", and is set to a mode for performing exposure control totally automatically. Further, by setting the mode lever 24 to "M position", the digital camera 10 is set to "manual photographing mode", and is set to a mode for manually performing exposure setting. Further, by setting the mode lever 24 to "moving image position", the digital camera 10 is set to "moving image photographing mode", and is set to a mode for photographing an moving image.

As "scene program photographing mode", for example, "person photographing mode" for photographing a person, "scenery photographing mode" for photographing scenery, "sports photographing mode" for photographing sports, "night view photographing mode" for photographing a night view, "underwater photographing mode" for performing underwater photographing and the like are prepared, and are set on a menu screen.

The power supply button 26 is an operating device for giving instruction of ON/OFF of a power supply of the digital camera 10, and is configured by a push button. In the digital camera 10, the power supply button 26 is pressed down continuously for a predetermined time period (for example, two seconds), and thereby the power supply of the digital camera 10 is turned ON/OFF.

The monitor 28 is a color LCD. The monitor 28 is used as an image display part for displaying a photographed image, and is also used as a GUI at the time of various setting. Further, at the time of photographing, the monitor 28 is used as an electronic finder, and the image captured by an image sensor is displayed on the monitor 28 in live view mode.

The zoom button 30 is an operating device for performing a zoom operation of the photographing lens 14 at the time of photographing, and a zoom operation of a reproduced image at the time of reproduction, and includes a zoom tele button for instructing zooming for telephotograph side, and a zoom wide button for instructing zooming to a wide angle.

The reproduction button 32 is an operating device for instructing switch to a reproduction mode, and is configured by a push button. The digital camera 10 is switched to the reproduction mode when the reproduction button 32 is pressed when the photographing mode is set. Further, when the reproduction button 32 is pressed in the state of the power supply being OFF, the digital camera 10 is actuated in the reproduction mode.

The function button 34 is an operating device for instructing call of a setting screen of a specific photographing function and reproducing function, and is configured by a push button. When the function button 34 is pressed at the time of photographing, the setting screen for the image size (number of recording pixels), sensitivity, image quality and the like is displayed on the monitor 28, and these settings can be performed in the digital camera 10. Further, when the function button 34 is pressed at the time of reproducing an image, the setting screen for reserving an order for printing the image which is displayed on the monitor 28 (DPOF), for setting a protection of the image which is displayed and the like is displayed, and these settings can be performed.

The cross button 36 is an operating device provided in a manner that it can be pressed in four directions of upward, downward, leftward and rightward directions. The functions corresponding to the states of the camera are allocated to the respective directions of the buttons. For example, in the case of performing photographing, the left button is assigned with the function of switching ON/OFF of the macro function, and the right button is assigned with the function of switching the flash mode. The upper button is assigned with the function of switching the brightness of the monitor 28, and the lower button is assigned with the function of switching ON/OFF of the self timer. Further, in the case of reproducing the image, the left button is assigned with the frame advancing function, and the right button is assigned with the frame returning function. The upper button is assigned with the function of changing the brightness of the monitor 28, and the lower button is assigned with the function of deleting the image being reproduced on the monitor 28. In the case of making various settings, a function of moving a cursor displayed on the monitor 28 to each button direction is assigned.

In the digital camera 10 of the present embodiment, in the flash mode, an auto light emission mode (flash light is automatically emitted in accordance with the photographing scene), a light emission forced mode (flash light is emitted forcibly), a light emission inhibiting mode (light emission is inhibited), a slow synchro mode (slow shutter photographing is performed), a red-eye reduction emission mode (red-eye reduction processing is performed), and two images photographing mode (two images of a flash-ON image and a flash-OFF image are photographed by one recording instruction (full press of the shutter button) are prepared, and the flash mode is sequentially switched every time the right button of the cross button 36 is pressed.

The MENU button 38 is an operating device for instructing call of the menu screen, and is configured by a press button. In the digital camera 10, various setting is performed on the menu screen called to the monitor 28 by pressing the MENU button 38. For example, various settings such as ON/OFF of a self timer function, switch of a photometric method, switch of an AF method, ON/OFF of a digital zoom function, switch of white balance (the kind of light source), ON/OFF of the continuous photographing function, date and time setting and the like are performed.

The OK button 40 is an operating device for instructing determination of an item selected on the menu screen or the like, and execution of processing, and is configured by a push button.

The cancel button 42 is an operating device for instructing cancel of an input operation, and is configure by a push button.

The speaker 44 outputs sounds. In the case of reproducing a moving image, sounds are output from the speaker 44.

Figure 3:
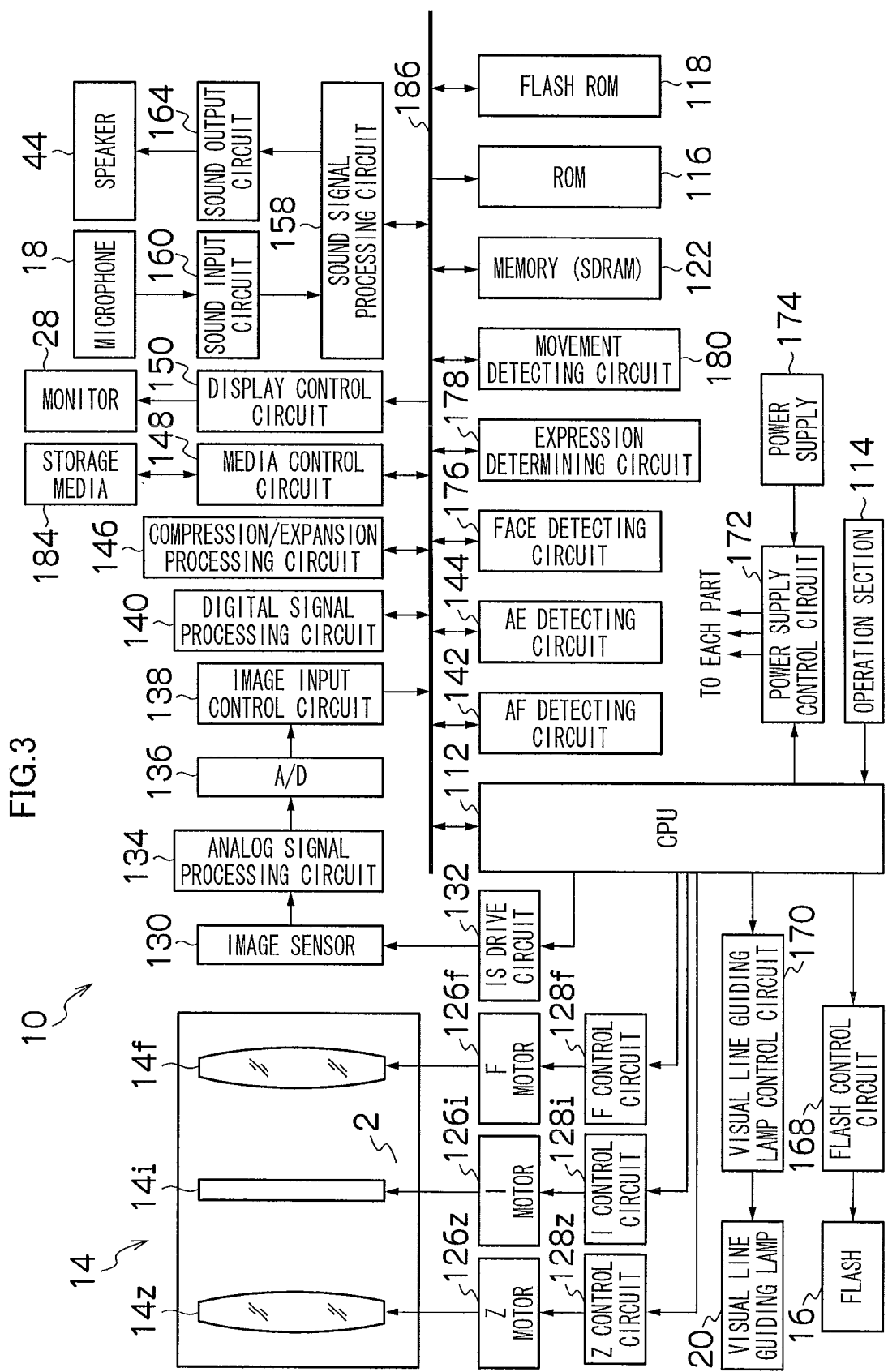
FIG. 3 is a block diagram showing a system configuration of the digital camera.

FIG. 3 is a block diagram showing a system configuration of the digital camera 10 shown in FIGS. 1 and 2.

As shown in FIG. 3, the digital camera 10 includes a CPU 112, an operation section 114, a ROM 116, a flash ROM 118, a memory (SDRAM) 120, the photographing lens 14, an image sensor 130, an image sensor drive circuit 132, an analog signal processing circuit 134, an A/D converting circuit 136, an image input control circuit 138, a digital signal processing circuit 140, an AF detecting circuit 142, an AE detecting circuit 144, a compression/expansion processing circuit 146, a media control circuit 148, a display control circuit 150, the monitor 28, a sound signal processing circuit 158, a sound input circuit 160, the microphone 18, a sound output circuit 164, the speaker 44, a flash control circuit 168, the flash 16, a visual line guiding lamp control circuit 170, the visual line guiding lamp 20, a power supply control circuit 172, a power supply 174, a face detecting circuit 176, an expression determining circuit 178, a motion detecting circuit 180.

The CPU 112 is a control device for performing overall control of the entire operation of the digital camera 10. The CPU 112 executes a predetermined program and controls each section of the digital camera 10. Further, the CPU 112 executes a predetermined program and executes various kinds of operation processing necessary for control.

In the ROM 116 which is connected to the CPU 112 through a bus 186, programs executed by the CPU 112 and various data and the like required for control are stored, and in the flash ROM 118, various setting information concerning the operation of the digital camera 10 and the like are stored.

The memory (SDRAM) 122 is used as a program execution area for the CPU 112, and is also used as a temporary storage area for data.

The operation section 114 outputs signals corresponding to operation on the respective operation buttons (the shutter button 22, the mode lever 24, the power supply button 26, the zoom button 30, the reproduction button 32, the function button 34, the cross button 36, the MENU button 38, the OK button 40, the cancel button 42) to the CPU 112.

The photographing lens 14 includes a zoom lens 14a, a diaphragm 14i, a focus lens 14f.

The zoom lens 14z is provided to be movable back and forth on the optical axis, and moves back and forth along the optical axis on the optical axis by being driven by a zoom motor 126. The focal length of the photographing lens 14 is changed by moving the zoom lens 14z back and forth. The CPU 112 controls the drive of the zoom motor 126z through the zoom control circuit 128z, and controls movement of the zoom lens 14z to control the focal length of the photographing lens 14.

The focus lens 14f is provided to be movable back and forth on the optical axis, and moves back and forth on the optical axis by being driven by a focus motor 126f. The focal position of the photographing lens 14 is changed by moving the focus lens 14f back and forth on the optical axis. The CPU 112 controls drive of the focus motor 126f through the focus control circuit 128f, and controls movement of the focus lens 14f to control the focal position of the photographing lens 14.

The diaphragm 14i is configured by an iris diaphragm, and an amount of opening of the diaphragm is made variable by being driven by a diaphragm motor 126i. In the photographing lens 14, an amount of light (aperture value) incident on the image sensor 130 is regulated by regulating the amount of opening of the diaphragm 14i. The CPU 112 controls drive of the diaphragm motor 126i through the diaphragm control circuit 128i, and controls the amount of opening of the diaphragm 14i, and thereby, controls the aperture value (F value).

In the present embodiment, the iris diaphragm is used, but a diaphragm of another configuration such as a turret diaphragm can be used.

The image sensor 130 is configured by a single-board color CCD (for example, a primary color CCD of a Bayer pattern). The image sensor drive circuit 132 drives the image sensor 130 in accordance with a command from the CPU 112 to cause the image sensor 130 to output signal charges accumulated in the respective photodiodes as voltage signals (image signals) in dot sequence. In the present embodiment, as the image sensor, a single-board color CCD is adopted, but the image sensor of another configuration such as CMOS may be used.

The analog signal processing circuit 134 includes a correlated double sampling circuit (CDS), and a gain control amplifier (AGC), and obtains analog image signals of R, G and B output in dot sequence from the image sensor 130, and performs necessary signal processing. Specifically, the correlated double sampling circuit removes amplifier noise and reset noise, and the gain control amplifier adjusts gain.

The A/D converting circuit 136 converts the analog image signal output from the analog signal processing circuit 134 into a digital image signal.

The image input control circuit 138 sequentially obtains the image signal output from the A/D converting circuit 136 in accordance with a command from the CPU 112, and stores the image signal in the memory 122 as image data of one frame.

The digital signal processing circuit 140 obtains image data (RAW data) stored in the memory 122, performs predetermined signal processing and generates visual image data, in accordance with a command from the CPU 112. More specifically, in the RAW data obtained from the single board type image sensor, each pixel has only single color information, and therefore, the digital signal processing circuit 140 generates image data in which each pixel has color information of three colors of R, G and B by performing necessary complement processing (demosaic processing). At the same time, the digital signal processing circuit 140 performs image processing (retouching processing) of brightness and contrast, white balance, sensitization correction, color saturation, sharpness and the like, and finally generates visible image data (image data for reproduction). Here, as the color image data, the digital signal processing circuit 140 generates Y/C data constituted of luminance data (Y data) and color difference data (Cr data, Cb data).

Image processing is ordinarily performed automatically (various parameters (development parameter) for performing image processing is automatically set to obtain an optimal image corresponding to a scene, and then the image processing is performed.), but when the user instructs correction for the specific image processing condition, the corresponding development parameter is corrected in accordance with the instructed condition, and then the image processing is executed. For example, when an instruction to make the brightness of an image higher or lower is given, the development parameter of brightness is corrected in accordance with the instructed extent, and then the image processing is performed. When an instruction to increase or decrease color saturation is given, the development parameter of the color saturation is corrected in accordance with the instructed extent, and then the image processing is performed. The image processing concerning other development parameters is carried out in a similar manner described above.

Instruction of correction is performed on the monitor 28 by calling an exclusive setting screen from the menu screen. In this exclusive setting screen, correction can be instructed in the range of ±10 by each stage for each development parameter (zero in default). The user selects the development item to be corrected, and inputs a correction amount by vertically moving the cross key.

When correction is instructed in this manner, the CPU 112 corrects the development parameter (standard development parameter) which is set automatically based on the instructed correction amount and causes the digital signal processing circuit 140 to perform image processing.

The image data (development data) generated by the digital signal processing circuit 140 is stored in the memory 122.

The AF detecting circuit 142 obtains the RAW data of one frame stored in the memory 122, and calculates a focus evaluation value necessary for AF control. The CPU 112 controls movement of the focus lens 14f based on the focus evaluation value output from the AF detecting circuit 142, and performs focusing. More specifically, the CPU 112 moves the focus lens 14f from a near side to an infinity side, searches the position where the focus evaluation value becomes the local maximum, moves the focus lens 14f to the searched position, and thereby performs focusing (so-called contrast AF).

The AE detecting circuit 144 obtains the RAW data of one frame stored in the memory 122, and calculates an integrated value necessary for AE control. More specifically, one screen is divided into a plurality of areas (for example, 8×8=64 areas), and calculates the integrated values of the R, G and B signals for each of the divided areas. The CPU 112 acquires the information of the integrated values of the R, G and B signals for each area calculated by the AE detecting circuit 144, and determines exposure at the time of actual photographing. More specifically, the CPU 112 calculates brightness of the subject (photometric value) from the acquired integrated values, calculates an exposure value (EV value) based on the calculated photometric value and set ISO sensitivity, and determines exposure (an aperture value and a shutter speed) at the time of actual photographing with reference to a predetermined program chart.

The compression/expansion processing circuit 146 compresses the input image data (Y/C data) with a predetermined compression format (JPEG in the present embodiment) in accordance with a command from the CPU 112, and generates compressed image data. Further, the compression/expansion processing circuit 146 expands the input compressed image data in accordance with a command from the CPU 112, and generates uncompressed image data (Y/C data).

The media control circuit 148 reads data from a storage media 184 in accordance with a command from the CPU 112, and the media control circuit 148 writes data to the storage media 184 in accordance with a command from the CPU 112. The storage media 184 is removably attachable to the memory card slot provided in the camera body 12 as a memory card.

The display control circuit 150 controls display of the monitor 28 in accordance with a command from the CPU 112. The display control circuit 150 includes an OSD (On Screen Display) circuit, and the OSD circuit superimposes characters, figures, codes or the like on the image, and displays the image on the monitor 28, The sound signal processing circuit 158 processes a sound signal input from the sound input circuit 160 in accordance with a command from the CPU 112, and generates a sound data for recording. Further, in accordance with a command from the CPU 112, the sound signal processing circuit 158 performs reproduction processing of the recorded sound data and outputs the sound data to the sound output circuit 164.

The sound input circuit 160 converts the sound signal inputted from the microphone 18 into a digital signal and outputs the digital signal to the sound signal processing circuit 158.

The sound output circuit 164 converts the sound signal output from the sound signal processing circuit 158 into an analog signal, and outputs the analog signal from the speaker 44.

The flash control circuit 168 controls light emission of the flash 16 in accordance with a command from the CPU 112.

The visual line guiding lamp control circuit 170 controls light emission of the visual line guiding lamp 20 in accordance with a command from the CPU 112.

The power supply control circuit 172 controls supply of the power which is supplied from the battery 174 to each section in accordance with a command from the CPU 112.

The face detecting circuit 176 detects a face area of a person included in an image from the input image data in accordance with a command from the CPU 112. More specifically, by pattern matching with a face template, the face area of a person is detected from the input image data. The information of the face area of the person which is detected is output to the CPU 112.

The method for detecting the face area of a person from an image is not limited to the method described above, and detection can be configured by using the other methods, for example, the method in which skin color data is extracted from the original image, and the cluster of the photometric points determined as the skin color range is extracted as a face, the method in which the photometry data is converted into the hue and color saturation, the two-dimensional histogram of the converted hue/color saturation is created and analyzed, and thereby, the face area is determined, the method in which the face candidate area corresponding to the shape of a human face is extracted, and the face area is determined from the characteristic amount in the area, the method in which the outline of a human face is extracted from the image, and the face area is determined, and the like.

The expression determining circuit 178 determines the expression of the face area detected by the face detecting circuit 176 in accordance with a command from the CPU 112. More specifically, the expression determining circuit 178 obtains the image data from which the face area is detected by the face detecting circuit 176, performs necessary image analysis on the obtained image data, and determines the expression of the person photographed in the image (for example, anger, hatred, fear, joy, Sorrow, surprise, absence of expression, or the like). The determination result is output to the CPU 112.

As the art of determining (recognizing) the expression (emotion) of the face of the person taken in an image, various known arts exist, and therefore, the expression can be determined by using these known arts. For example, the characteristic amount indicating the positional relationship of the characteristic points set to the face organs such as eyes and a mouth is calculated, and the expression is estimated from the characteristic amount.

The movement detecting circuit 180 detects the moving amount of the subject which is being photographed from the image data obtained from the image sensor 130 in accordance with a command from the CPU 112. More specifically, the movement detecting circuit 180 takes in the image data continuously from the image sensor 130, obtains the difference between the image data taken in previously and the image data taken in next, and the moving amount of the subject is detected. The information of the detected moving amount of the subject is output to the CPU 112.

The method for detecting the moving amount of the subject from the image is not limited to the method described above, and the detection can be configured by the other methods.

<Basic Operation>

Next, the basic operations of photographing and reproduction by the digital camera 10 of the present embodiment will be described.

First, the basic operation in the case of photographing will be described.

Photographing is performed by setting the mode of the camera to the photographing mode. The digital camera 10 of the present embodiment is actuated in the photographing mode when the power supply of the camera is turned on.

When the mode of the camera is set to the photographing mode, the image for display in live view mode (pass-through display) is continuously taken in from the image sensor 130. The image signals which are taken in are continuously processed and output to the monitor 28. The photographer (the user) looks at the image (the image displayed in live view mode; through image) displayed on the monitor 28 and confirms the composition, and half-presses the shutter button 22 to instruct execution of photographing preparation.

When the shutter button 22 is half-pressed, a S1ON signal is input into the CPU 112. The CPU 112 operates in response to input of the S1ON signal, and executes photographing preparation processing, that is, each processing of AE and AF.

First, the image signal output from the image sensor 130 is applied to the AE detecting circuit 144 and the AF detecting circuit 142.

The AE detecting circuit 144 calculates integrated values necessary for AE control from the input image signal, and outputs the integrated values to the CPU 112. The CPU 112 determines exposure based on the integrated values obtained from the AE detecting circuit 144.

Further, the AF detecting circuit 142 calculates a focus evaluation value necessary for AF control from the input image signal, and outputs the focus evaluation value to the CPU 112. The CPU 112 controls movement of the focus lens 14f based on the focus evaluation value obtained from the AF detecting circuit 142, and focuses the photographing lens 14 on a main subject.

The photographer looks at the through image displayed on the monitor 28, confirms the focusing state and the like, and fully presses the shutter button 22 to instruct execution of the actual photographing.

When the shutter button 22 is fully pressed, an S2ON signal is input into the CPU 112. The CPU 112 operates in response to the S2ON signal and executes the processing of the actual photographing.

First, the image sensor 130 is exposed with the exposure determined in the above described AE, and the image for recording is taken.

The image signal for recording output from the image sensor 130 is subjected to necessary signal processing in the analog signal processing circuit 134, and thereafter, is converted into a digital signal in the A/D converting circuit 136 to be taken into the memory 122 from the image input control circuit 138.

The image data (RAW data) taken into the memory 122 is inputted to the digital signal processing circuit 140, where the image data is subjected to necessary development processing, and is converted into the image data (Y/C data) composed of the luminance data Y and the color difference data Cr and Cb.

The generated image data is temporarily stored in the memory 122, and thereafter, is inputted to the compression/expansion processing circuit 146, where the image data is subjected to necessary compression processing and is converted into compressed image data.

The generated compressed image data is stored in the memory 122. The CPU 112 adds predetermined accessory information to the compressed image data stored in the memory 122, and generates the image file in the predetermined format (Exif in the present embodiment).

The generated image file is recorded in the storage media 184 through the media control circuit 148. In the digital camera 10 of the present embodiment, the image file is recorded in the storage media 184 in accordance with the DCF (Design rule for Camera File system established by the Japanese Electronic Industry Development Association) standard.

In the above described example, the example in which the image data obtained by photographing is compressed and recorded is described, but the image data can be recorded without being compressed. The image data can be recorded as the RAW data, and in this case, the image data (RAW data) after A/D conversion is directly recorded in the storage media 184. The photographer can select the recording mode at the time of photographing.

Next, the basic operation in the case of the image reproduction will be described.

Reproduction of an image is performed by setting the mode of the camera to the reproduction mode. Switching from the photographing mode to the reproduction mode is performed by pressing the reproduction button 32. When the power supply of the camera is turned OFF, the camera is actuated in the reproduction mode by pressing the reproduction button 32. When the shutter button 22 is half-pressed in the reproduction mode, the mode of the camera is switched to the photographing mode.

When the mode of the camera is set to the reproduction mode, the CPU 112 reads the image data of the image file which is finally recorded in the storage media 184 through the media control circuit 148. The read image data is subjected to necessary expansion processing in the compression/expansion processing circuit 146, and thereafter, is output to the monitor 28 through the display control circuit 150.

Thereby, the image recorded in the storage media 184 is reproduced and displayed on the monitor 28.

When the image data of the image file finally recorded is uncompressed image data, the image data is directly output to the monitor 28 through the display control circuit 150. Further, when the image data of the image file finally recorded is RAW data, the image data is subjected to necessary development processing in the digital signal processing circuit 140, and thereafter, is output to the monitor 28 through the display control circuit 150.

Frame advancing/frame returning of an image is performed with the right button/left button of the cross button 36. When the right button is pressed, the next image is read from the storage media 184, and is reproduced and displayed on the monitor 28. When the left button is pressed, the previous image is read from the storage media 184, and is reproduce and displayed on the monitor 28.

<Visual line Guiding Processing>

The digital camera 10 of the present embodiment is equipped with the function of visual line guidance. When the function is activated, the visual line guiding lamp 20 blinks to call attention of the subject to guide the visual line of the subject to the photographing lens 14.

Figure 4:
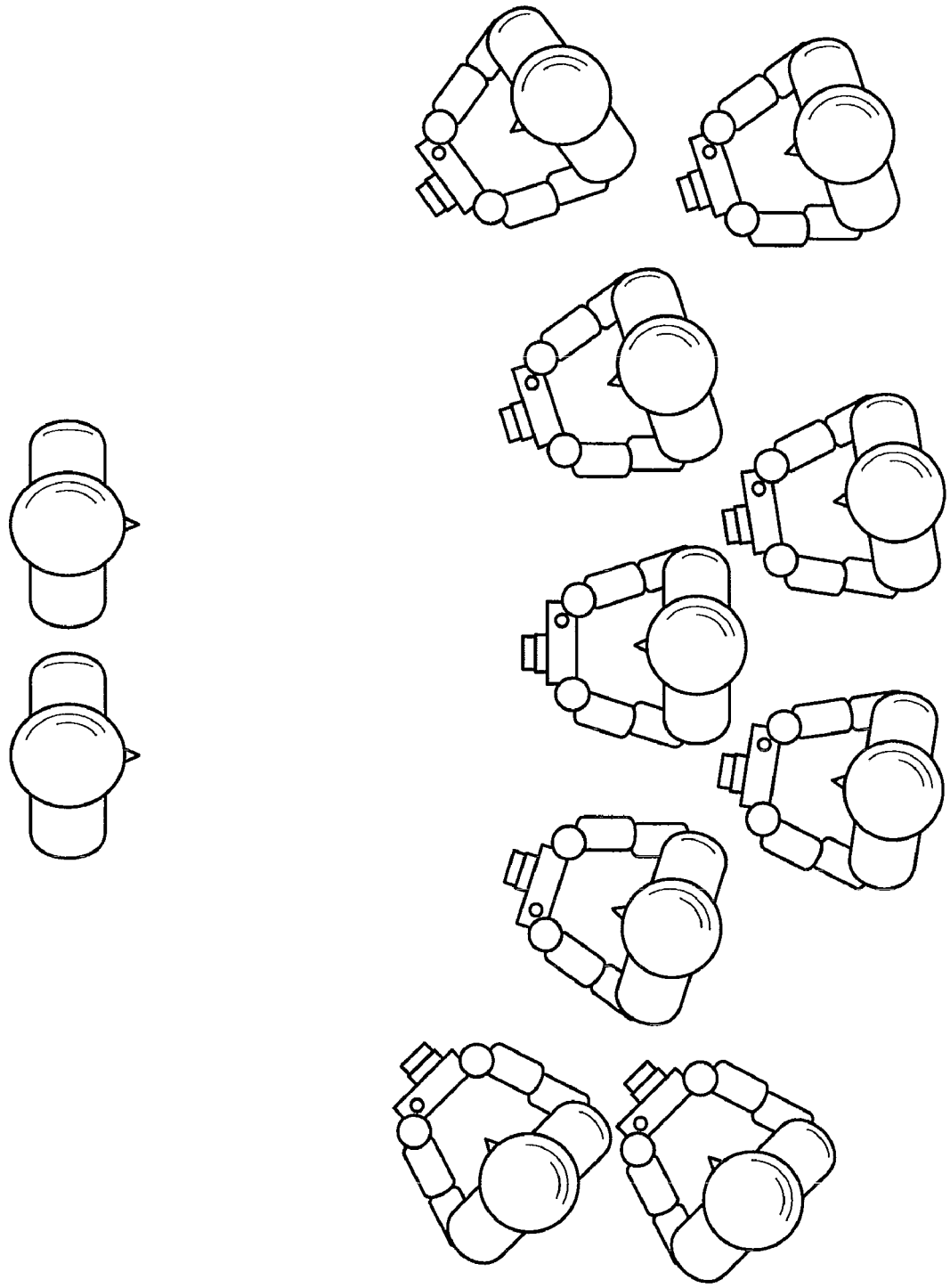
FIG. 4 is an explanatory view of a photographing situation of a photo session.

As shown in FIG. 4, the function of the visual line guidance is especially effectively performed in such a photographing situation that many photographers (nine in the drawing) surround a small number of subjects (two in the drawing) and photograph the subjects (for example, a wedding ceremony and the like, hereinafter, called "a situation of a photo session".). The digital camera 10 of the present embodiment automatically discriminates a photographing situation, and automatically activates the visual line guiding function in the case of the situation of a photo session.

Figure 5:
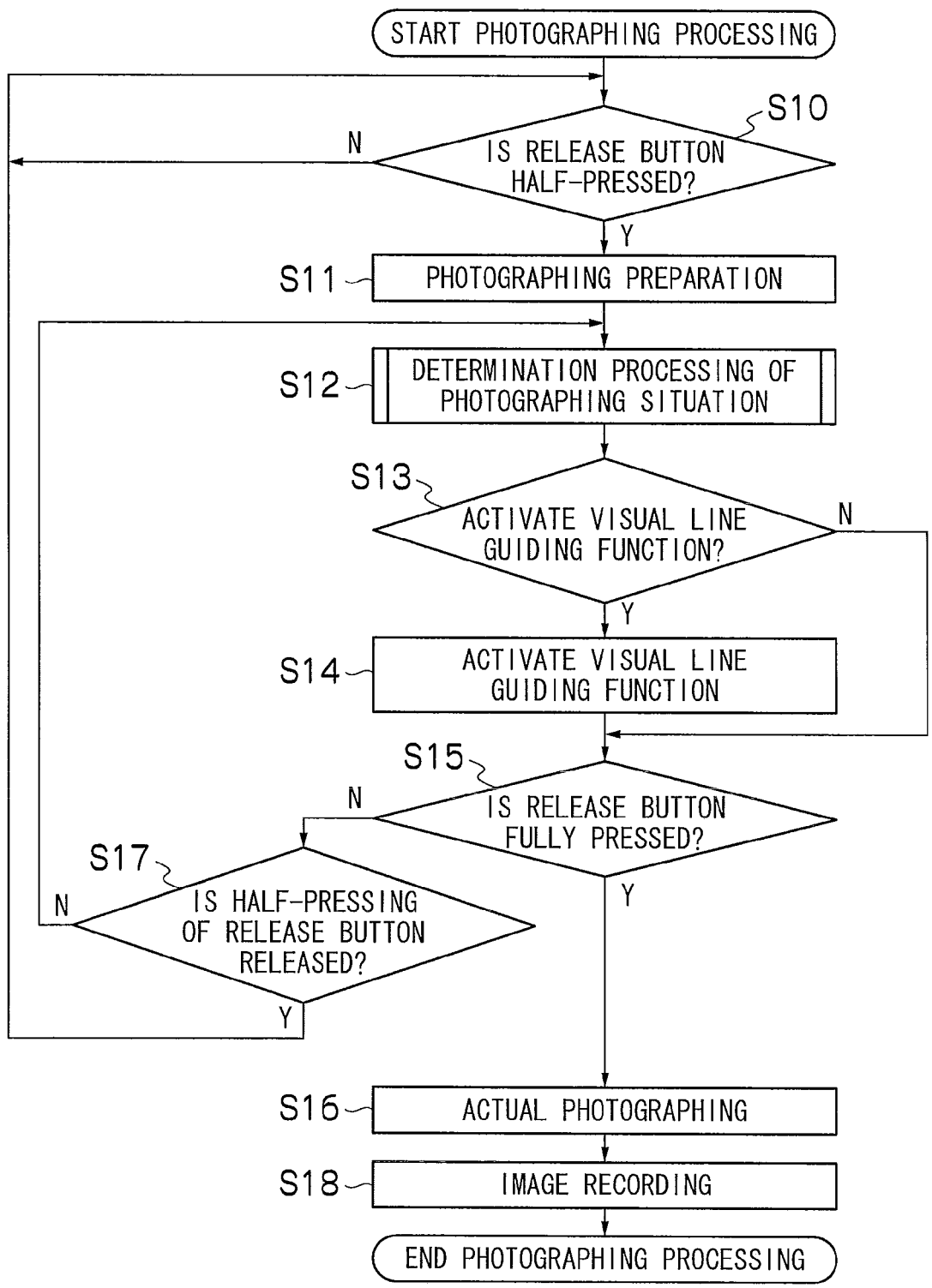
FIG. 5 is a flowchart showing procedure in process in the case of determining a photographing situation and performing photographing.

FIG. 5 is a flowchart showing procedure of processing in the case of discriminating a photographing situation and performs photographing.

As described above, a through image is displayed on the monitor 28 at the time of photographing. Therefore, the photographer determines the composition by looking at the through image, and half-presses the shutter button 22 to instruct photographing preparation.

As described above, when the shutter button 22 is half-pressed, an S1ON signal is input into the CPU 112 from the operation section 114. The CPU 112 determines whether the shutter button 22 is half-pressed or not based on the signal input from the operation section 114 (step S10).

When the shutter button 22 is half-pressed, the CPU 112 determines that photographing preparation is instructed, and performs photographing preparation processing (step S11). Specifically, the CPU 112 executes each processing of AE and AF.

When the photographing preparation is completed, the CPU 112 performs determination processing of the photographing situation based on the image data taken in for displaying the through image (step S12). More specifically, the CPU 112 determines whether or not a face area of a person exists in the screen (present photographing range), and when the face area exists in the screen, the CPU 112 determines whether or not the ratio of the face area in the screen is greater than or equal to a threshold value. When the ratio of the face area in the screen is greater than or equal to the threshold value, the CPU 112 determines whether or not the face is a smiling face, and determines whether or not the photographing situation is that of a photo session. Specifically, when all the requirements described above are satisfied, the CPU 112 determines that the photographing situation is that of a photo session where many people photograph a small number of subjects, and otherwise, the CPU 112 determines that the photographing situation is not that of a photo session.

Figure 6:
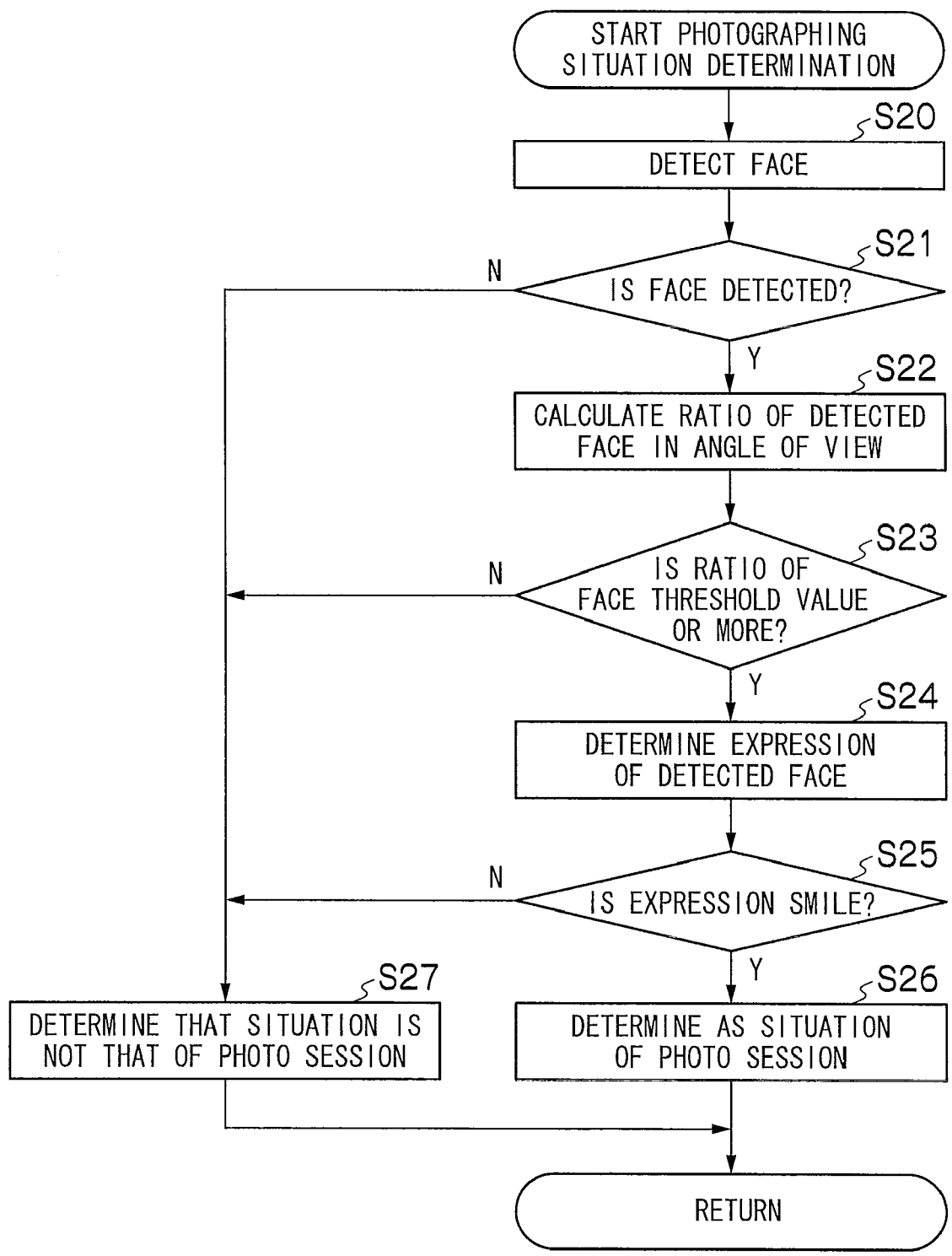
FIG. 6 is a flowchart showing procedure in determining process of a photographing situation.

FIG. 6 is a flowchart showing procedure of determination processing of a photographing situation.

First, the face area of a person is detected from the inside of the screen (step S20). Detection of the face area is performed in the face detecting circuit 176, and the image data taken in for displaying the through image is applied to the face detecting circuit 176 to detect the face area of a person in the screen.

The CPU 112 acquires the detection result of the face area from the face detecting circuit 176, and determines whether or not the face area of a person exists in the screen (step S21).

When determining that the face area of a person does not exist in the screen, the CPU 112 determines that the present photographing situation is not a situation of a photo session (step S27), and finishes the determination processing of the photographing situation.

Meanwhile, when determining that the face area of a person exists in the screen, the CPU 112 subsequently calculates the ratio of the detected face area in the screen based on the detection result of the face area (step S22).

The CPU 112 determines whether or not the calculated ratio is greater than or equal to a threshold value (step S23), Specifically, it is considered that in the situation of a photo session where many people photograph a small number of subjects, the faces of persons are generally photographed to be relatively large. Therefore, it is determined whether or not the face of a person is photographed in the screen with the size which is a predetermined size or larger (whether the ratio of the face area of the person in the screen is greater than or equal to the threshold value).

When determining the ratio of the face area of the person in the screen is less than the threshold value by the determination of step S23, the CPU 112 determines that the present photographing situation is not a situation of a photo session (step S27), and finishes the determination processing of the photographing situation.

Meanwhile, when determining that the ratio of the face area of the person in the screen is greater than or equal to the threshold value, the CPU 112 determines the expression of the detected faces next (step S24). Determination of the expression is performed in the expression determining circuit 178. The image data in which the faces are detected is inputted to the expression determining circuit 178, and the expression of the face in the detected face area is determined.

The CPU 112 acquires the determination result of the expression from the expression determining circuit 178, and determines whether or not the detected face of the person is a smiling face (step S25).

When determining that the face of the person detected in the determination of step S25 is not a smiling face, the CPU 112 determines that the present photographing situation is not a situation of a photo session (step S27), and finishes the determination processing of the photographing situation.

Meanwhile, when determining that the face of the person which is detected is a smiling face, the CPU 112 determines that the present photographing situation is a situation of a photo session where many people photograph a small number of subjects (step S26), and finishes the determination processing of the photographing situation.

Thereafter, returning to the photographing processing flow (FIG. 5), and the CPU 112 determines whether activation of the visual line guiding function is necessary or not based on the determination result of the photographing situation (step S13). Specifically, if the present photographing situation is determined as the situation of a photo session as a result of determining the photographing situation, the CPU 112 determines that activation of the visual line guiding function is necessary. Meanwhile, if determining the present photographing situation is not a situation of a photo session, the CPU 112 determines that activation of the visual line guiding function is not necessary.

When determining that activation of the visual line guiding function is necessary by this determination of step S13, the CPU 112 causes the visual line guiding lamp 20 to blink in a predetermined mode, and activates the visual line guiding function (step S14). The blinking the visual line guiding lamp 20 calls attention of the subjects, and the visual lines of the subjects are guided to the photographing lens 14.

Thereafter, the CPU 112 determines whether or not the shutter button 22 is fully pressed based on input of the operation section 114 (step S15), and determines whether or not an instruction of the actual photographing is performed.

When activation of the visual line guiding function is determined to be unnecessary in the above described step S13, the CPU 112 determines whether or not the shutter button 22 is fully pressed based on input from the operation section 114 (step S15), and determines whether or not an instruction of the actual photographing is performed.

As described above, when the shutter button 22 is fully pressed, an S2ON signal is input into the CPU 112 from the operation section 114, and therefore, the CPU 112 determines whether or not the shutter button 22 is fully pressed based on input of the S2ON signal.

When determining that the shutter button 22 is not fully pressed here, the CPU 112 determines whether or not half-pressing of the shutter button 22 is released (step S17). When determining that half-pressing of the shutter button 22 is released, the procedure returns to step S10, and the CPU 112 determines presence or absence of half-pressing of the shutter button 22 again.

Meanwhile, when determining that the shutter button 22 is fully pressed, the CPU 112 executes the processing of the actual photographing (step S16). More specifically, the image sensor 130 is exposed with exposure determined by AE to pick up the image for recording. The obtained image data is recorded in the storage media 184 (step S17).

In this manner, in the digital camera 10 of the present embodiment, the photographing situation is automatically recognized, and the visual line guiding function is automatically activated. Therefore, a favorable image with the sight directly facing into the camera can be easily photographed.

In the above described embodiment, when the ratio of the face area of the person in the screen is greater than or equal to a threshold value, and the expression of the face of the person in the screen is a smiling face, the photographing situation is determined as the situation of a photo session where many people photograph a small number of subjects, but the determining method of the situation of a photo session is not limited to the above mentioned method. The determination can be configured by detecting at least one of the ratio of the face of the subject in the screen, the orientation of the face of the subject in the screen, the distance from the digital camera 10 to the subject in the screen, the moving amount of the subject in the screen, the expression of the face of the subject in the screen, and the change amount of brightness of the subject in the screen within a predetermined time period, and detecting the situation of a photo session is determined based on the detection result of at least one of the above mentioned parameters.

Specifically, as described above, when many people photograph a small number of subjects, the faces of the subjects are frequently taken in the screen to be large. Therefore, the ratio of the face of the subject in the screen is detected, and when the ratio is a predetermined ratio or more, the photographing situation is determined as a situation of a photo session.

Further, when many people photograph a small number of subjects, the face of the subject in the screen frequently faces the front of the digital camera 10 (including a situation that the face of the subject faces substantially the front of the digital camera 10). Therefore, the orientation of the face of the subject in the screen is detected, and when the orientation is to the front, the photographing situation is determined as that of a photo session.

Further, when many people photograph a small number of subjects, the distance to the subjects in the screen is frequently close (considered to be about 1 to 3 m). Therefore, the distance to the subjects in the screen is detected, and when the distance is within a predetermined range, the photographing situation is determined as that of a photo session.

When many people photograph a small number of subjects as described above, the expression of the subjects in the screen is frequently a smile. Therefore, the expression of the subjects in the screen is determined, and in the case of a smile, the photographing situation is determined as that of a photo session.

Further, when many people photograph a small number of subjects, the subjects in the screen are frequently motionless. Therefore, the moving amount of the subjects in the screen is detected, and when the moving amount is a predetermined amount or less, the photographing situation is determined as that of a photo session.

When many flashlights are fired, it is considered that many people photograph a small number of subjects. Therefore, the change amount in the brightness of the subjects in the screen in a predetermined time period is detected, and when the change amount is a predetermined amount or more, the photographing situation is determined as that of a photo session. Specifically, in such a case, the faces of the subjects are in the flashlights of the other cameras, and a large brightness difference occurs in a short time. Therefore, the change amount of the brightness of the subjects in the screen in a predetermined time period is detected, and when the change amount is a predetermined amount or more, the photographing situation is determined as that of a photo session.

It is possible to determine the photographing situation based on one of the determination items. However, in order to determine the photographing situation with higher precision, it is preferable that a plurality of determination items are combined, and when the above mentioned requirements corresponding to the plurality of determination items are satisfied in all the items (in the case of being affirmative in determination of all the items), the photographing situation is determined as that of a photo session.

Further, determination is performed in a plurality of determination items, and when the predetermined number of the requirements or more are satisfied, the photographing situation may be determined as that of a photo session. Determination is performed in all of the items of, for example, whether or not the ratio of the face of the subject in the screen is greater than or equal to a threshold value, whether or not the orientation of the face of the subject in the screen is to the front, whether the distance to the subject in the screen is in a predetermined range, whether the moving amount of the subject in the screen is a threshold value or less, whether the expression of the face of the subject in the screen is a smile, and whether the change amount of the brightness of the subject in the screen in a predetermined time period is greater than or equal to a threshold value. When the requirements corresponding to at least three items are satisfied, the photographing situation may be determined as that of a photo session.

Further, a specific determination item may be set as an essential item, and when the other determination items are satisfied in addition to the essential item, the photographing situation may be determined as that of a photo session. For example, it is set as the essential item that the ratio of the face of the subject in the screen is greater than or equal to a threshold value, and when at least one of the requirements is satisfied, that is, the requirements that the orientation of the face of the subject in the screen is to the front of the digital camera 10, the distance to the subject in the screen is in a predetermined range, the moving amount of the subject in the screen is a threshold value or less, the expression of the face of the subject in the screen is a smile, and the change amount of the brightness of the subject in the screen in a predetermined time period is greater than or equal to a threshold value, in addition to the essential item, the photographing situation may be determined as that of a photo session.

Among the above described respective determination items, that is, (1) whether or not the ratio of the face of the subject in the screen is greater than or equal to a threshold value, (2) whether or not the orientation of the face of the subject in the screen is to the front, (3) whether the distance to the subject in the screen is in a predetermined range, (4) whether the moving amount of the subject in the screen is a threshold value or less, (5) whether the expression of the face of the subject in the screen is a smile, and (6) whether the change amount of the brightness of the subject in the screen in a predetermined time period is greater than or equal to a threshold value, the three items of (2) whether or not the orientation of the face of the subject in the screen is to the front, (3) whether the distance to the subject in the screen is in a predetermined range, and (4) whether the moving amount of the subject in the screen is a threshold value or less are considered to have the highest correlation with the situation of a photo session. (1) Whether or not the ratio of the face of the subject in the screen is greater than or equal to a threshold value is considered to have the next highest correlation. Subsequently, (6) whether the change amount of the brightness of the subject in the screen in a predetermined time period is greater than or equal to a threshold value, and (5) whether the expression of the face of the subject in the screen is a smile are considered to have higher correlation with the situation of a photo session in this order.

Accordingly, detection is preferably performed for the three items of (2) whether or not the orientation of the face of the subject in the screen is to the front, (3) whether the distance to the subject in the screen is in a predetermined range, and (4) whether the moving amount of the subject in the screen is a threshold value or less, and when the requirements of all the items are satisfied, the photographing situation is preferably determined as that of a photo session.

When the situation of a photo session is to be discriminated with higher precision, it is preferable that detection is also made for the item of (1) whether or not the ratio of the face of the subject in the screen is greater than or equal to a threshold value is also detected in addition to the above described three items ((2) whether or not the orientation of the face of the subject in the screen is to the front, (3) whether the distance to the subject in the screen is in a predetermined range, and (4) whether the moving amount of the subject in the screen is a threshold value or less), and when the requirements of all the items are satisfied, the photographing situation is determined as that of a photo session.

Further, when the situation of a photo session is to be discriminated with higher precision, it is preferable that detection is also performed for (6) whether the change amount of the brightness of the subject in the screen in a predetermined time period is greater than or equal to a threshold value, and/or (5) whether the expression of the face of the subject in the screen is a smile, in addition to the above described four items of (2) whether or not the orientation of the face of the subject in the screen is to the front, (3) whether the distance to the subject in the screen is in a predetermined range, (4) whether the moving amount of the subject in the screen is a threshold value or less, and (1) whether or not the ratio of the face of the subject in the screen is greater than or equal to a threshold value, and when the requirements of all the items are satisfied, the photographing situation is determined as that of a photo session.

In addition to the above described three items of (2) whether or not the orientation of the face of the subject in the screen is to the front, (3) whether the distance to the subject in the screen is in a predetermined range, and (4) whether the moving amount of the subject in the screen is a threshold value or less, detection may be also performed for (6) whether the change amount of the brightness of the subject in the screen in a predetermined time period is greater than or equal to a threshold value, and/or (5) whether the expression of the face of the subject in the screen is a smile, and when the requirements of all the items are satisfied, the photographing situation may be determined as that of a photo session.

Further, detection is performed for all the items of (1) whether or not the ratio of the face of the subject in the screen is greater than or equal to a threshold value, (2) whether or not the orientation of the face of the subject in the screen is to the front, (3) whether the distance to the subject in the screen is in a predetermined range, (4) whether the moving amount of the subject in the screen is a threshold value or less, (5) whether the expression of the face of the subject in the screen is a smile, and (6) whether the change amount of the brightness of the subject in the screen in a predetermined time period is greater than or equal to a threshold value, and when the requirements are satisfied in the three items of (2) whether or not the orientation of the face of the subject in the screen is to the front, (3) whether the distance to the subject in the screen is in a predetermined range, and (4) whether the moving amount of the subject in the screen is a threshold value or less, and the requirement is satisfied in at least one of the items of (1) whether or not the ratio of the face of the subject in the screen is greater than or equal to a threshold value, (6) whether the change amount of the brightness of the subject in the screen in a predetermined time period is greater than or equal to a threshold value, and (5) whether the expression of the face of the subject in the screen is a smile, the photographing situation may be determined as that of a photo session.

The items to be detected and determined are preferably selected properly and set in accordance with the functions mounted on the camera. Specifically, in the case of the camera mounted with the face detection function for face detection AF (the function of detecting the face area in the screen and automatically focusing on the detected face) and the like, the ratio of the face area of a person in the screen can be detected by using this function. Therefore, the ratio of the face area of a person in the screen is detected, and the photographing situation is determined.

Further, when the expression determining function is included for the function of automatically performing photographing in accordance with the expression (for example, the function of determining a smiling face and automatically photographing it) and the like, the photographing situation is determined by using the expression determining function.

Similarly, when the function of detecting a face orientation is included, the photographing situation is determined by using the function of detecting a face orientation.

Further, when the function of detecting the moving amount of a subject is included for prevention of blur of the photographed image and the like, the photographing situation is determined by using the function of detecting the moving amount. For example, the digital camera 10 of the above described embodiment includes the movement detecting circuit 180, and therefore, the photographing situation can be determined by using this.

Further, the distance to the subject can be measured by image analysis, but it also can be obtained by using the result of AF control (for example, the distance can be obtained by arithmetic operation from the positional information of the focus lens 14*f*).

Detection of the ratio of the face of the subject in the screen, the orientation of the subject in the screen, the distance to the subject in the screen, the moving amount of the subject in the screen, the expression of the face of the subject in the screen and the change amount of the brightness of the subject in the screen in a predetermined time period which are described above can be all performed in the exclusive hardware. However, the above mentioned detection also can be performed by analyzing the image data, and therefore, detection of them can be realized by software. When it is realized by software, the number of components is not increased, and therefore, the software can be mounted at low cost.

In the above described embodiment, as the visual line guiding function, the visual line guiding lamp 20 is caused to blink in the predetermined mode, but the configuration of visual line guidance is not limited to this. Other than this, visual line guidance may be performed by generating a predetermined sound from the speaker 44 (for example, a sound such as "Look this way" is generated from the speaker 44.).

Further, visual line guidance may be performed by activating a plurality of visual line guiding functions. Visual line guidance may be performed by causing the visual line guiding lamp 20 to blink in a predetermined mode and also generating a predetermined sound from the speaker 44, for example.

Further, in the above described embodiment, as the visual line guiding device, the exclusive visual line guiding lamp 20 is placed at the camera body 12, but by configuring the visual line guiding device by using the existing device on the camera, the number of components can be reduced. For example, when a flash is included, the flash may be caused to blink at a high speed, and used for visual line guidance. Further, when a self timer lamp is included, the self timer lamp may be caused to emit light and blink in a predetermined mode, and used for visual line guidance. Further, when an AF auxiliary light lamp is included, the AF auxiliary light lamp may be caused to emit light and blink in a predetermined mode, and used for visual line guidance.

When the visual line guiding function is activated, the visual line guiding lamp 20 may be continuously caused to emit light until actual photographing is performed, or may be caused to emit light for a predetermined time period and stopped (in this case, if it is determined as the situation of a photo session again, the visual line guiding lamp 20 is caused to emit light again.).

Further, a plurality of light emitting modes of the visual line guiding lamp 20 may be prepared so that the user can make selection.

Further, the visual line guiding lamp 20 may be caused to emit plural colors of lights instead of emitting a light of a single color. For example, the visual line guiding lamp 20 may be configured by LEDs of red, blue and green, and may be caused to emit lights from the LEDs in sequence. Thereby, attention can be called more.

In the above described embodiment, the example of the case in which a person is adopted as a subject, but the subject is not limited to this, animals such as pets can be adopted as subjects.

[Second Embodiment]

A digital camera of the present embodiment determines the photographing situation based on a shutter sound which occurs around the digital camera. Specifically, when a number of shutter sounds occur around the digital camera in a predetermined period, the photographing situation is considered to be the photographing situation where many people photograph a small number of subjects (situation of a photo session). Therefore, in such a case, the digital camera activates the visual line guiding function automatically.

Figure 7:
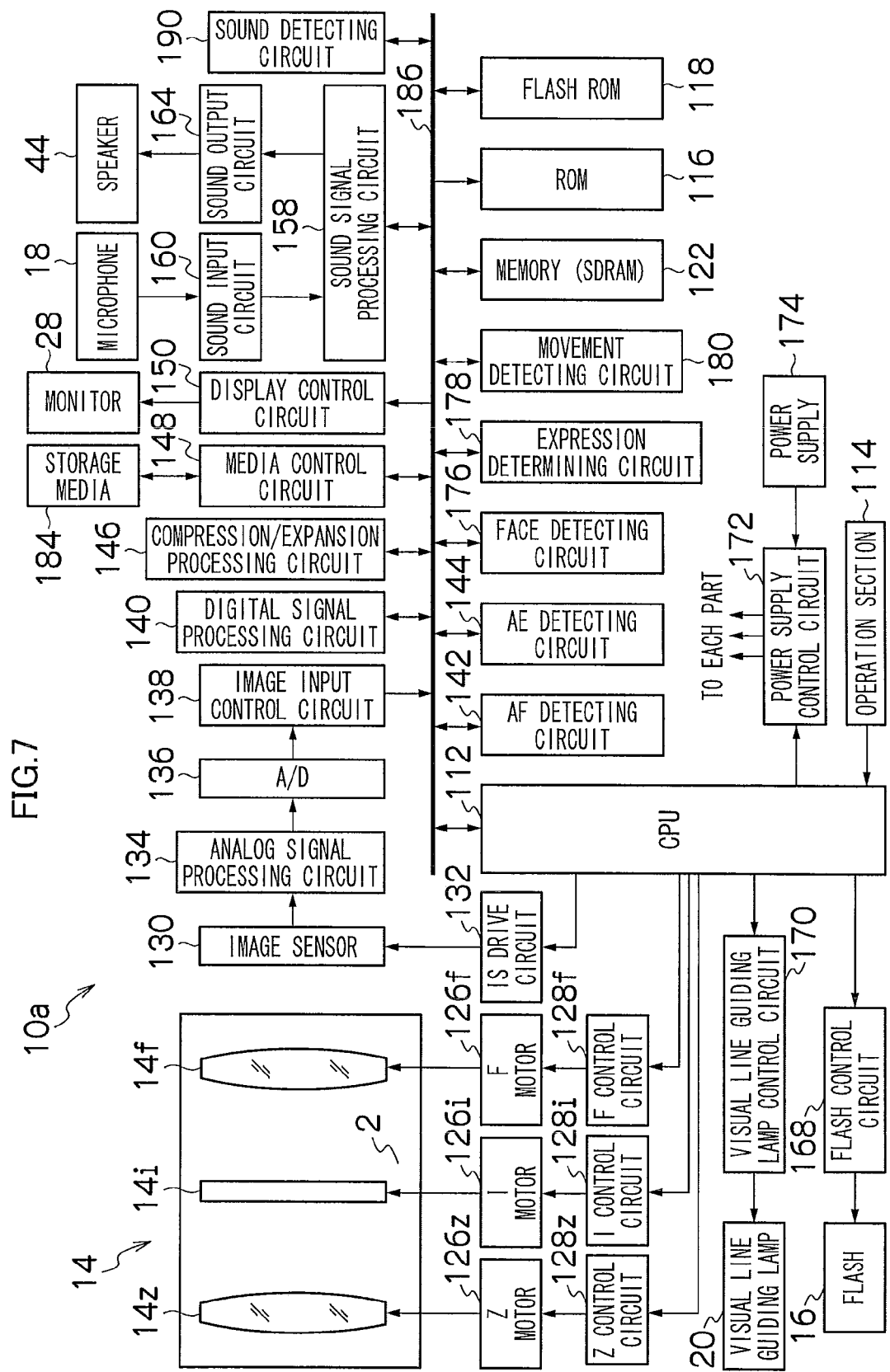
FIG. 7 is a block diagram showing a system configuration of a digital camera (second embodiment)

FIG. 7 is a block diagram showing a system configuration of a digital camera 10*a* of the present embodiment.

As shown in FIG. 7, the digital camera 10*a* of the present embodiment differs from the digital camera 10 of the aforementioned first embodiment in the feature of including a sound detecting circuit 190. Accordingly, only the configuration of the sound detecting circuit 190 will be described here.

The sound detecting circuit 190 analyzes sound data to detect a shutter sound in accordance with an instruction of the CPU 112. The digital camera 10*a* of the present embodiment detects the waveform of a shutter sound from the waveform of the sound data of the sound around the digital camera 10*a* which the digital camera 10*a* picks up, and detects the shutter sound.

Since the shutter sound varies according to manufacturers and models of cameras, it is preferable that the digital camera 10*a* stores the waveform data of a plurality of shutter sounds, and checks the waveform of the sound data which the digital camera 10*a* picks up with the waveform data of the plurality of shutter sounds to detect the shutter sound in the sound around the digital camera 10*a*. The digital camera 10*a* of the present embodiment stores a sound waveform data of a plurality of shutter sounds in the flash ROM 118 as a shutter sound database, and checks the waveform of the sound data of the sound around the digital camera 10*a* with the waveform data of the plurality of shutter sounds to detect the shutter sound in the sound around the digital camera 10*a*. It is preferable to make it possible to add the sound waveform data to the sound database if necessary.

Determination of the photographing situation is performed based on the number of shutter sounds detected in a predetermined time period. When a number of shutter sounds detected in the predetermined time period is greater than or equal to the predetermined number, the digital camera 10*a* determines that the photographing situation is that of a photo session.

When the shutter button 22 is half-pressed and photographing preparation is instructed, the digital camera 10*a* of the present embodiment picks up sounds around the digital camera 10*a* by using the microphone 18, and makes determination of the photographing situation based on the sounds which the digital camera 10*a* was picked up. More specifically, the digital camera 10*a* continuously picks up the sounds at predetermined taking intervals, and when a number of the shutter sounds which is detected by the digital camera 10*a* from the sounds picked up is greater than or equal to the predetermined number, the photographing situation is determined as that of a photo session.

Figure 8:
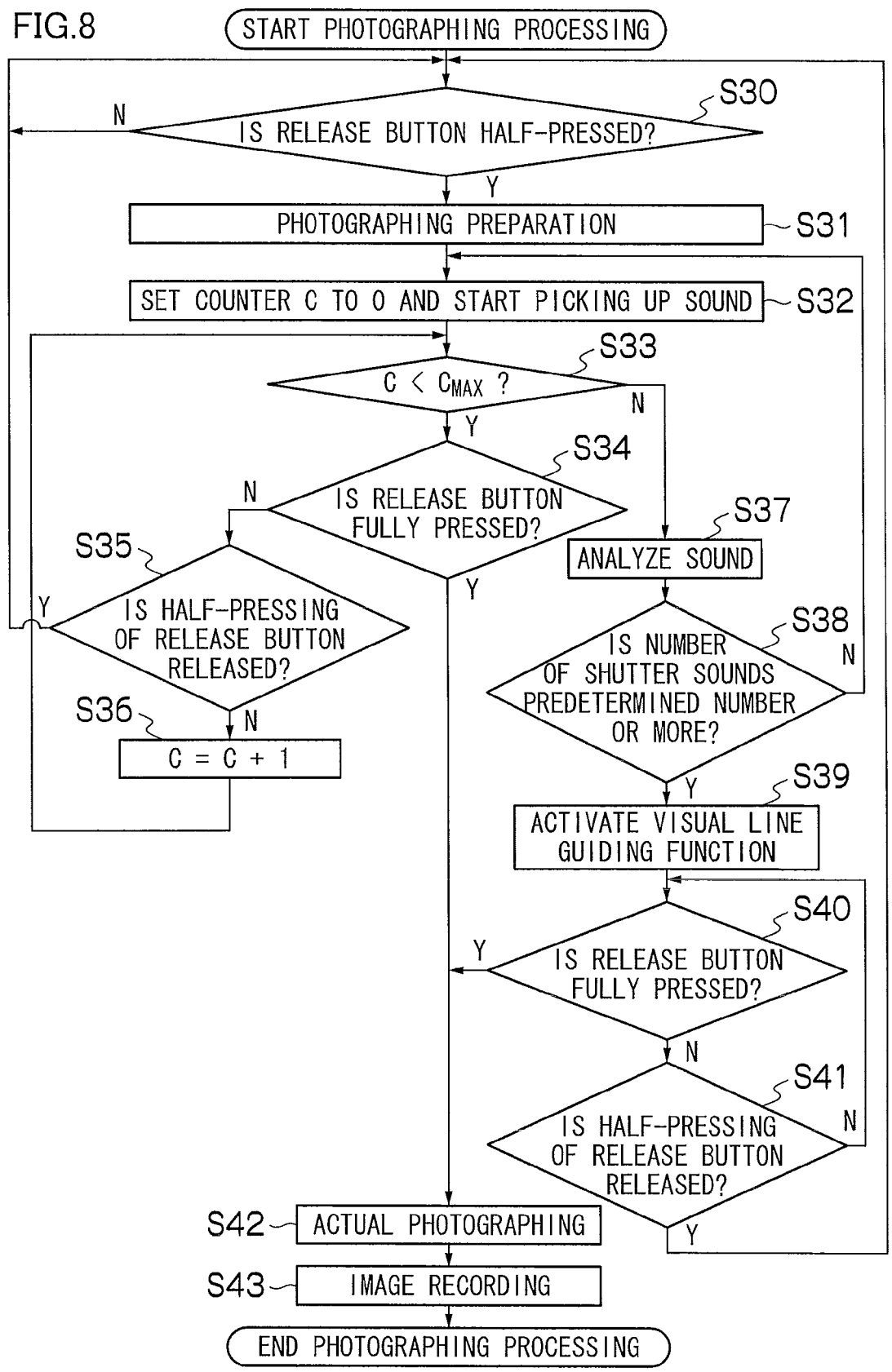
FIG. 8 is a flowchart showing procedure of photographing process (second embodiment)

FIG. 8 is a flowchart showing procedure of photographing processing in the digital camera of the present embodiment.

In the case of photographing, a through image is displayed on the monitor 28. Therefore, the photographer determines the composition by looking at the through image displayed on the monitor 28, and half-presses the shutter button 22 to instruct the photographing preparation.

The CPU 112 determines whether or not the shutter button 22 is half-pressed based on the signal input from the operation section 114 (step S30).

When the shutter button 22 is half-pressed, the CPU 112 determines that the photographing preparation is instructed, and performs photographing preparation processing (step S31). More specifically, each processing of AE and AF is executed.

Further, with start of photographing preparation, the CPU 112 sets the value of a counter C to zero, and starts picking up of a sound (step S32). The sound picked up by the digital camera 10*a* is consecutively processed in the sound signal processing circuit 158, and is stored in the memory 122.

Thereafter, the CPU 112 determines whether or not the value of the counter C exceeds a threshold value $C_{MAX}$ (step S33). When the CPU 112 determines that the value of the counter C does not exceed the threshold value $C_{MAX}$ in this determination, the CPU 112 determines whether or not the shutter button 22 is fully pressed based on input of the operation section 114 (step S34), and determines whether or not the instruction of actual photographing is performed.

When the CPU 112 determines that the shutter button 22 is fully pressed, the CPU 112 performs the actual photographing (step S42), records the obtained image data in the storage media 184 (step S43) and finishes photographing processing.

Meanwhile, when the CPU 112 determines that the shutter button 22 is not fully pressed, the CPU 112 determines whether or not half-pressing of the shutter button 22 is released (step S35). When determining that half-pressing of the shutter button 22 is released, the CPU 112 stops picking up the sound, and the procedure returns to step S30. Specifically, the CPU 112 detects the shutter button 22 again, and starts over again from the photographing preparation.

Meanwhile, when the CPU 112 determines that half-pressing of the shutter button 22 is not released, the CPU 112 adds one to the value of the counter C (step S36), and the procedure returns to step S33. Specifically, the CPU 112 determines whether or not the value of the counter C exceeds the threshold value $C_{MAX}$ (step S33).

When the CPU 112 determines that the value of the counter C exceeds the threshold value $C_{MAX}$ (specifically, when the CPU 112 determines a predetermined time period elapses from the start of picking up the sound), the CPU 112 performs detection of shutter sounds from the sound picked up (step S37). More specifically, the CPU 112 inputs the sound data which is picked up to the sound detecting circuit 190 and causes the sound detecting circuit 190 to make detection of the shutter sounds (step S37).

The CPU 112 acquires a result of the detection of the shutter sounds by the sound detecting circuit 190, determines whether or not the detected shutter sound is greater than or equal to a threshold value, and detects whether activation of the visual line guiding function is necessary or not (step S38). More specifically, when a number of the detected shutter sound is greater than or equal to the predetermined number (the threshold value) within a predetermined period (while the counter C is less than or equal to the value $C_{MAX}$), the CPU 112 determines that the photographing situation is that of a photo session, and determines that activation of the visual line guiding function is necessary. Meanwhile, when a number of the detected shutter sound is less than the predetermined number (the threshold value) within the predetermined period (while the counter C is less than or equal to the value $C_{MAX}$), the CPU 112 determines that the photographing situation is not that of a photo session, and determines that the activation of the visual line guiding function is not necessary.

When determining that the activation of the visual line guiding function is necessary (determining that the number of the detected shutter sounds is greater than or equal to the threshold value), the CPU 112 causes the visual line guiding lamp 20 to blink in a predetermined mode, and activates the visual line guiding function (step S39). The blink of the visual line guiding lamp 20 calls attention of the subject, and the visual line of the subject is guided to the photographing lens 14.

Thereafter, the CPU 112 determines whether or not the shutter button 22 is fully pressed based on input from the operation section 114 (step S40), and determines whether or not an instruction of actual photographing is performed. When determining that the shutter button 22 is fully pressed, the CPU 112 performs processing of the actual photographing (step S42), and the image obtained by photographing is recorded in the storage media 184 (step S43).

Meanwhile, when determining that the shutter button 22 is not fully pressed, the CPU 112 determines whether or not half-pressing of the shutter button 22 is released (step S41). When determining that half-pressing of the shutter button 22 is released, the procedure returns to step S30, and the CPU 112 detects half-pressing of the shutter button 22 again, and starts over again from the photographing preparation.

When determining that the number of the detected shutter sounds is less than the threshold value in the above described step 38, and determines that activation of the visual line guiding function is not necessary, the procedure returns to step S32, the CPU 112 sets the counter C to zero and starts picking up the sounds again.

More specifically, as long as the shutter button 22 is half-pressed, the detection of the shutter sounds is performed, and when the number of the detected shutter sounds is greater than or equal to the predetermined number, the visual line guiding function is activated.

As described above, the digital camera 10a of the present embodiment automatically recognizes the photographing situation from the shutter sounds occurring around the digital camera 10a, and automatically activates the visual line guiding function. Therefore, a favorable image which is photographed under the situation that the visual line of the photographic subject faces into the digital camera 10a directly can be easily photographed.

Further, the shutter sounds are sounds peculiar to the cameras, and do not generate from the apparatuses other than the cameras. Therefore, the photographing situation can be accurately detected based on the shutter sounds.

Further, by utilizing a camera including a microphone, the digital camera 10a of the present embodiment can be implemented without increasing the number of components, and cost reduction can be achieved.

In the above described embodiment, the photographing situation is determined based on only the shutter sounds. In addition to the shutter sounds, the photographing situation may be determined by detecting the face area of a person from an image. More specifically, the digital camera 10a detects the face area of the person from the image for displaying the through image which is taken in after the shutter button 22 is half-pressed. And, if the digital camera 10a detects the face area, and the number of the detected shutter sounds is greater than or equal to the predetermined number in the predetermined time period, the photographing situation may be determined as that of a photo session, and the visual line guiding function may be activated.

[Third Embodiment]

The digital camera of the second embodiment detects the photographing situation based on the shutter sounds occurring around the digital camera. Meanwhile, the digital camera of the present embodiment detects the photographing situation by detecting voices which are frequently made in the photographing situation of a photo session, for example, "Look this way", "I'm taking a photo" or the like.

The basic configuration of the apparatus is the same as that of the digital camera 10a of the aforementioned second embodiment, and therefore, only the determination method of the photographing situation and the procedure of processing in the case of photographing will be described.

Determination of the photographing situation is performed based on the sound picked up from the microphone 18, and when a sound which is registered in advance is detected, the photographing situation is determined as that of a photo session.

In concrete, when the shutter button 22 is half-pressed, and photographing preparation is instructed, the sound around the digital camera is picked up from the microphone 18, and a waveform data of a specific sound is detected from the sound which is picked up, whereby utterance of the specific sound is detected.

Specific sounds are included in advance as a database, and are stored in the flash ROM 118. The sound detecting circuit 190 checks the sound picked up with a waveform of the sound registered in the database, and detects the specific sound from the sound data.

It is preferable to make it possible to add the sound waveform data of the specific sound to the database if necessary.

Figure 9:
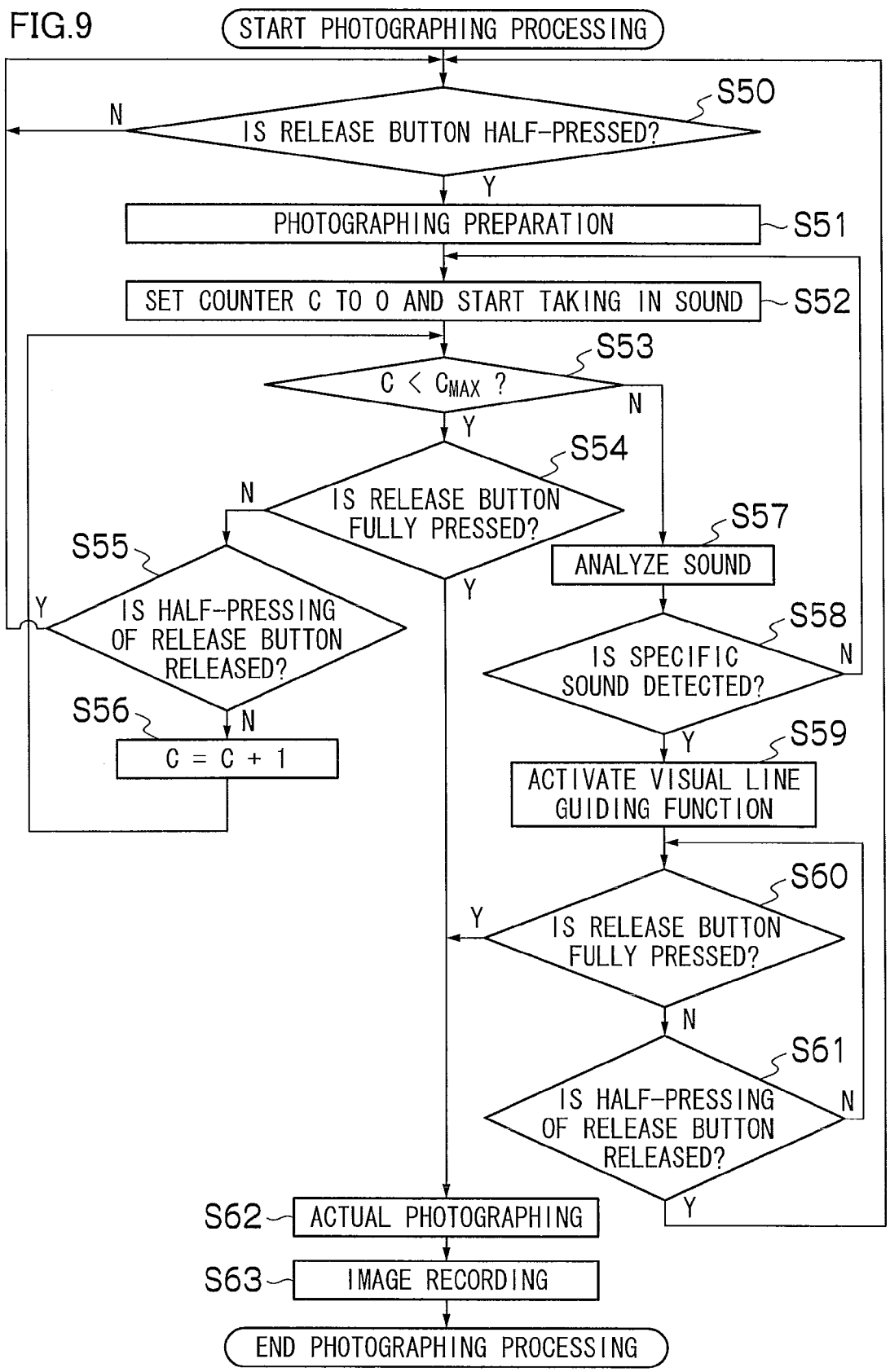
FIG. 9 is a flowchart showing procedure of photographing process (third embodiment)

FIG. 9 is a flowchart showing procedure of the photographing processing in the digital camera of the present embodiment.

In the case of photographing, a through image is displayed on the monitor 28. Therefore, the photographer determines the composition by looking at the through image on the monitor 28, half-presses the shutter button 22 to instruct the photographing preparation.

The CPU 112 determines whether or not the shutter button 22 is half-pressed based on the signal input from the operation section 114 (step S50).

When the shutter button 22 is half-pressed, the CPU 112 determines that photographing preparation is instructed, and performs photographing preparation processing (step S51). More specifically, each processing of AE and AF is executed.

Further, with start of photographing preparation, the CPU 112 sets the value of a counter C to zero, and starts picking up of a sound (step S52). The sound picked up by the digital camera 10a is consecutively processed in the sound signal processing circuit 158 and are stored in the memory 122.

Thereafter, the CPU 112 determines whether or not the value of the counter C exceeds a threshold value $C_{MAX}$ (step S53). When the CPU 112 determines that the value of the counter C does not exceed the threshold value $C_{MAX}$ in this determination, the CPU 112 determines whether or not the shutter button 22 is fully pressed based on input of the operation section 114 (step S54), and determines whether or not the instruction of actual photographing is performed.

When the CPU 112 determines that the shutter button 22 is fully pressed, the CPU 112 performs the actual photographing (step S52), records the obtained image data in the storage media 184 (step S53), and finishes photographing processing.

Meanwhile, when the CPU 112 determines that the shutter button 22 is not fully pressed, the CPU 112 determines whether or not half-pressing of the shutter button 22 is released (step S55). When determining that half-pressing of the shutter button 22 is released, the CPU 112 stops picking up the sound, and the procedure returns to step S50. Specifically, the CPU 112 detects the shutter button 22 again, and starts over again from the photographing preparation.

Meanwhile, when the CPU 112 determines that half-pressing of the shutter button 22 is not released, the CPU 112 adds one to the value of the counter C (step S56), and the procedure returns to step S33. Specifically, the CPU 112 determines whether or not the value of the counter C exceeds the threshold value $C_{MAX}$ (step S33).

When the CPU 112 determines that the value of the counter C exceeds the threshold value $C_{MAX}$, the CPU 112 performs processing of detection of a specific sound from the sound picked up (step S57). Mores specifically, the CPU 112 inputs the sound data picked up to the sound detecting circuit 190, and causes the sound detecting circuit 190 to make detection of the specific sound.

The CPU 112 acquires a the detection result of the specific sound by the sound detecting circuit 190, determines whether or not the specific sound is detected, and determines whether or not activation of the visual line guiding function is necessary (step S58). Specifically, when the specific sound is detected, the CPU 112 determines that the photographing situation is the situation of a photo session, and determines that the activation of the visual line guiding function is necessary. Meanwhile, when the specific sound is not detected, the CPU 112 determines that the photographing situation is not a situation of a photo session, and determines that the activation of the visual line guiding function is not necessary.

When determining that the activation of the visual line guiding function is necessary, the CPU 112 causes the visual line guiding lamp 20 to blink in a predetermined mode, and causes the visual line guiding function to activate (step S59). The blinking of the visual line guiding lamp 20 calls attention of the subject, and the visual line of the subject is guided to the photographing lens 14.

Thereafter, the CPU 112 determines whether or not the shutter button 22 is fully pressed based on input from the operation section 114 (step S60), and determines whether or not the instruction of actual photographing is performed. When determining that the shutter button 22 is fully pressed, the CPU 112 performs the processing of the actual photographing (step S62), and records the image obtained by the actual photographing in the storage media 184 (step S63).

Meanwhile, when determining that the shutter button 22 is not fully pressed, the CPU 112 determines whether or not half-pressing of the shutter button 22 is released (step S61). When determining that half-pressing of the shutter button 22 is released, the procedure returns to step S50, the CPU 112 detects half-pressing of the shutter button 22 again, and starts over again from the photographing preparation.

Further, in the above described step S58, when determining that the specific sound is not detected, the procedure returns to step S52, the CPU 112 sets the counter C to zero, and starts picking up sounds again.

More specifically, as long as the shutter button 22 is half-pressed, the detection of the specific sound is performed, and when the specific sound is detected, the visual line guidance function is activated.

As described above, the digital camera 10a of the present embodiment detects the specific sounds which occur around the digital camera 10a (sounds which are frequently made in a photographing situation of a photo session), recognizes the photographing situation automatically, and automatically activates the visual line guiding function. Therefore, a favorable image which is photographed under the situation that the visual line of the photographic subject faces into the digital camera 10a directly can be easily photographed.

In the case of this example, the situation of a photo session can be accurately detected even if cameras which make no shutter sounds are used around the digital camera 10a.

Further, by utilizing a camera including a microphone, the digital camera 10a of the present embodiment can be implemented without increasing the number of components, and cost reduction can be achieved.

In the above described embodiment, the photographing situation is determined based on only a sound occurring around the digital camera 10a. In addition to the sound, the photographing situation may be determined by detecting the face area of a person from an image. More specifically, the digital camera 10a detects the face area of the person from the image for displaying the through image which is taken in after the shutter button 22 is half-pressed. And, if the digital camera 10a detects the face area, and the specific sound is detected, the photographing situation may be determined as that of a photo session, and the visual line guiding function may be activated.

[Fourth Embodiment]

The digital camera of the above described first to third embodiments automatically activates the visual line guiding function when the photographing situation is determined as that of a photo session by the digital camera. However, if the other cameras activate the visual line guiding functions at the same time, the subjects are confused.

Thus, the digital camera of the present embodiment detects whether or not the other cameras are activating the visual line guiding functions in advance, and prohibits its own visual line guiding function when the other cameras are activating the visual line guiding functions.

Here, when the visual line guiding function is implemented by the visual line guiding lamp, the digital camera 10b of the present embodiment determines whether or not the other cameras are activating the visual line guiding function by detecting the hue of the image data obtained from the image sensor. Specifically, when the other cameras perform visual line guidance by emitting light of the visual line guiding lamps, the hue of the image obtained from the image sensor is influenced by the light of the visual line guiding lamps and the image is tinted (for example, when blue light is emitted, the image is tinted with blue), and therefore, by detecting this, the digital camera 10b detects that the visual line guiding functions of the other cameras are activated.

Figure 10:
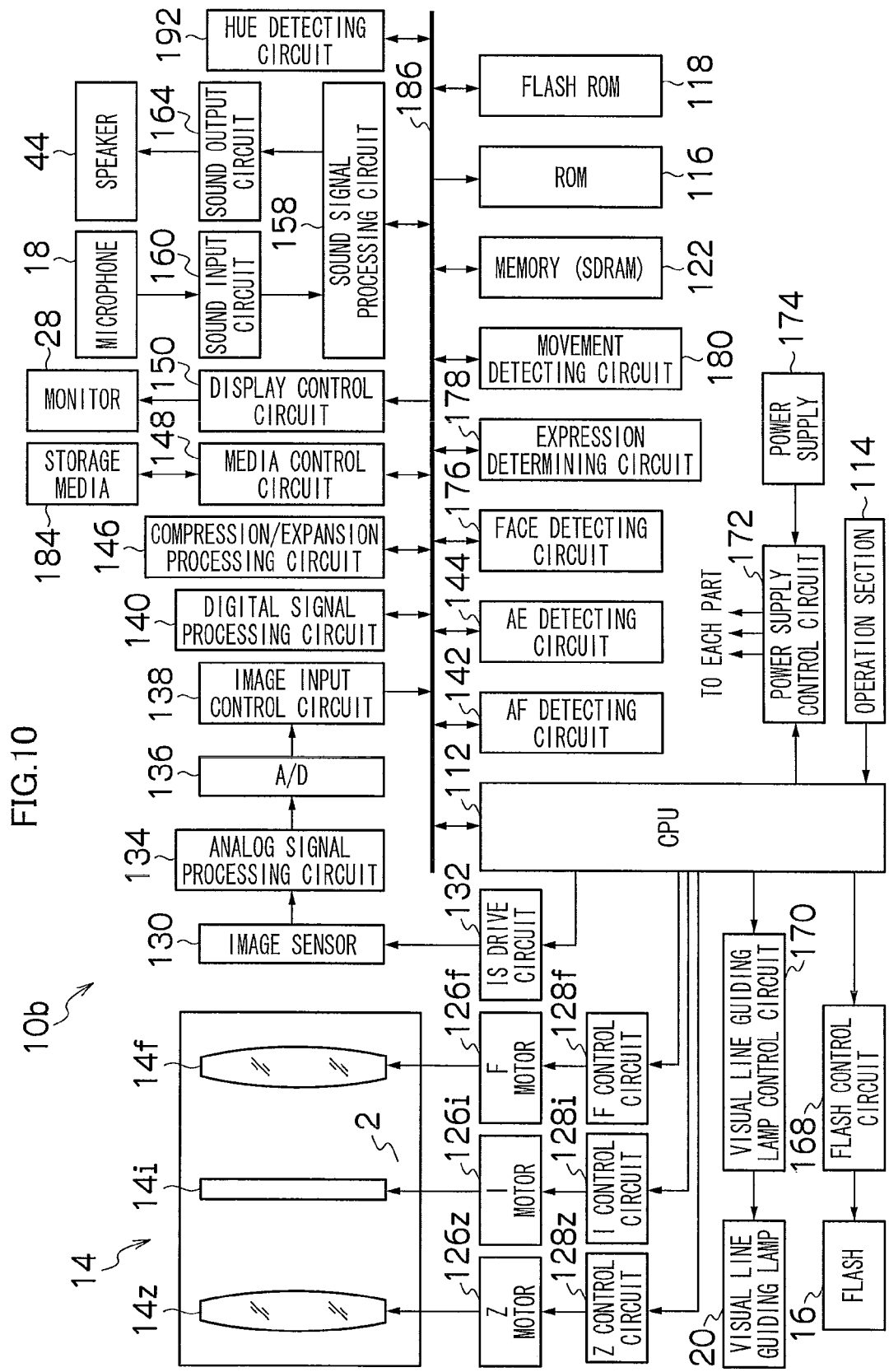
FIG. 10 is a block diagram showing a system configuration of a digital camera 10b (fourth embodiment)

FIG. 10 is a block diagram showing a system configuration of a digital camera 10b of the present embodiment.

As shown in FIG. 10, the digital camera 10b of the present embodiment differs from the digital camera 10 of the first embodiment in the feature of including a hue detecting circuit 192.

The hue detecting circuit 192 detects the hue of the input image data in accordance with an instruction of the CPU 112. More specifically, the hue detecting circuit 192 detects a hue angle $\Theta$ of the entire screen ($\Theta = \tan^{-1} Cb/Cr$).

The information of the detected hue angle $\Theta$ is output to the CPU 112. The CPU 112 determines whether or not the visual line guiding functions of the other cameras are activated based on the obtained hue angle $\Theta$. More specifically, the CPU 112 determines whether or not the obtained $\Theta$ satisfies $\Theta 1 \leq \Theta \leq \Theta 2$, and determines whether or not the visual line guiding functions of the other cameras are activated. The range of $\Theta 1 \leq \Theta \leq \Theta 2$ is the range of the hue angle of the image when the visual line guiding functions of the other cameras are activated. Accordingly, when the luminescent color of the visual line guiding lamps is blue, the range of the hue angle of blue color is set.

Figure 11:
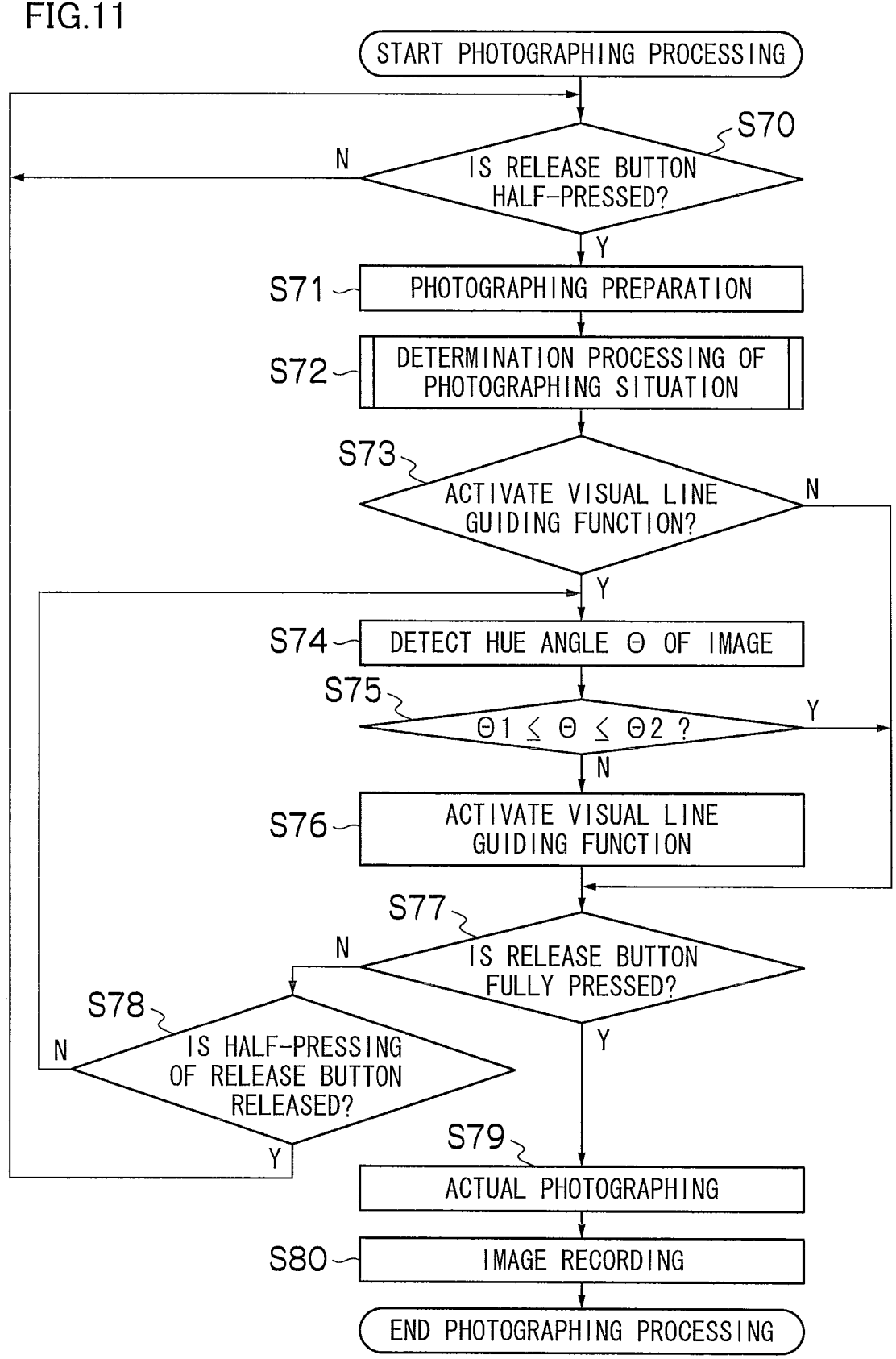
FIG. 11 is a flowchart showing procedure of photographing process (fourth embodiment).

FIG. 11 is a flowchart showing procedure of photographing processing in the digital camera 10b of the present embodiment.

Determination processing of the photographing situation is performed based on the image data taken in for displaying the through image, similarly to the above described first embodiment. Specifically, it is determined whether or not the face area of a person exists in the screen, and when the face area exists, it is determined whether or not the ratio of the face area in the screen is greater than or equal to a threshold value. When the ratio of the face area in the screen is greater than or equal to the threshold value, it is determined whether or not the face is a smiling face, and then, it is determined whether or not the photographing situation is that of a photo session. That is to say, when all the above mentioned requirements are satisfied, the photographing situation is determined as that of a photo session where many people photograph a small number of subjects, and otherwise, it is determined that the photographing situation is not that of a photo session.

The photographer determines the composition by looking at the through image displayed on the monitor 28, and half-presses the shutter button 22 to instruct the photographing preparation.

The CPU 112 determines whether or not the shutter button 22 is half-pressed based on the signal input from the operation section 114 (step S70).

When the shutter button 22 is half-pressed, the CPU 112 determines that the photographing preparation is instructed, and performs photographing preparation processing (step S71).

When completing the photographing preparation, the CPU 112 performs determination processing of the photographing situation based on the image data taken in for displaying the through image (step S72). More specifically, the CPU 112 determines whether or not the face area of a person exists in the screen (present photographing range), and when the face area exists, the CPU 112 determines whether or not the ratio of the face area in the screen is greater than or equal to a threshold value. When the ratio of the face area in the screen is greater than or equal to the threshold value, the CPU 112 determines whether or not the face is a smiling face, and makes determination whether or not the photographing situation is that of a photo session. More specifically, when all the above mentioned requirements are satisfied, the CPU 112 determines it is the situation of a photo session where many people photograph a small number of subjects, and otherwise, the CPU 112 determines that it is not a situation of a photo session.

The CPU 112 determines whether or not activation of the visual line guiding function is necessary based on a determination result of the photographing situation (step S73). Specifically, if the present photographing situation is determined as the situation of a photo session as a result of determination of the photographing situation, the CPU 112 determines that activation of the visual line guiding function is necessary. Meanwhile, if the present photographing situation is not determined as the situation of a photo session, the CPU 112 determines that activation of the visual line guiding function is not necessary.

When determining that the activation of the visual line guiding function is necessary by the determination, the CPU 112 detects presence or absence of activation of the visual line guiding functions of the other cameras. More specifically, the CPU 112 detects presence or absence of competition.

First, the CPU 112 inputs the image data taken in for displaying the through image to the hue detecting circuit 192, and detects the hue angle $\Theta$ of the entire screen (step S74). The CPU 112 determines whether or not the obtained hue angle is within the predetermined range of the hue angle ($\Theta 1 \leq \Theta \leq \Theta 2$) (step S75). More specifically, the CPU 112 determines whether or not the hue of the screen is the hue obtained when the visual line guiding functions of the other cameras are activated.

When determining that the hue of the screen is not in the predetermined range ($\Theta 1 \leq \Theta \leq \Theta 2$) of the hue angle (determining that the hue of the screen is not the hue obtained when the visual line guiding functions of the other cameras are activated), the CPU 112 causes the visual line guiding lamp 20 to blink in a predetermined mode, and activates the visual line guiding function (step S76). The blink of the visual line guiding lamp 20 calls attention of the subject, and the visual line of the subject is guided to the photographing lens 14.

Thereafter, the CPU 112 determines whether or not the shutter button 22 is fully pressed based on the input of the operation section 114 (step S77), and determines whether or not an instruction of the actual photographing is performed.

When determining that the shutter button 22 is not fully pressed, the CPU 112 determines whether or not half-pressing of the shutter button 22 is released (step S78). When determining that half-pressing of the shutter button 22 is released, the procedure returns to step S70, and the CPU 112 determines presence or absence of the shutter button 22 again.

Meanwhile, when determining that the shutter button 22 is fully pressed, the CPU 112 performs processing of the actual photographing (step S79), and records the image data obtained by photographing in the storage media 184 (step S80).

Further, when determining that the hue of the screen is in the above described step 75 in the predetermined range (Θ1≦Θ≦Θ2) of the hue angle (when determining that the hue of the screen is the hue obtained when the visual line guiding functions of the other cameras are activated), the CPU 112 stops activation of the visual line guiding function. Accordingly, in this case, the CPU 112 skips the activation processing of visual line guidance, and determines whether or not the shutter button 22 is fully pressed (step S77).

Thereby, the competition of visual line guidance can be prevented, and the confusion of the subjects can be prevented.

In this case, when determining the shutter button 22 is not fully pressed in the above described step S77, and further determining that half-pressing is not released in step S78, the procedure returns to step S74, and the CPU 112 detects presence or absence of the activation of the visual line guiding functions of the other cameras again, and detects presence or absence of competition.

When competition is eliminated (when the visual line guiding functions of the other cameras are not activated), the CPU 112 activates its own visual line guiding function again, and calls attention of the subject.

Thus, according to the digital camera 10b of the present embodiment, the competition of the visual line guidance can be prevented, and therefore, photographing can be performed without confusing the subject.

Further, in the digital camera 10b of the present embodiment, the activation states of the visual line guiding functions of the other cameras are detected based on the image data obtained from the image sensor 130. Therefore, the activation states of the visual line guiding functions of the other cameras can be detected without additionally providing a detecting sensor or the like.

In the present embodiment, the activation states of the visual line guiding functions of the other cameras are detected by detecting the hue of the screen, but the method for detecting the activation state of the visual line guiding functions of the other cameras is not limited to this. Other than this, for example, in the case that the digital camera 10b includes the function of performing radio communication among cameras, the activation states of the visual line guiding functions of the other cameras may be detected by notifying each other of the activation states of their own visual line guiding functions. Further, for example, when visual line guidance is performed by making a specific sound, the activation state of the visual line guiding functions of the other cameras may be detected by detecting the sound.

Further, in the above described embodiment, as in the digital camera of the first embodiment, the determination of the photographing situation is performed based on the image data obtained from the image sensor 130, but as in the digital camera of the above described second embodiment, determination of the photographing situation may be performed by detecting the shutter sounds occurring around the digital camera. Similarly, as in the digital camera of the above described third embodiment, the photographing situation may be determined by detecting a specific sound made around the digital camera.

[The Other Embodiments]

The photographing situation is determined by analyzing an image data in the above described first embodiment, by detecting the shutter sound occurring in the surroundings in the second embodiment, and by detecting a specific sound made in the surroundings in the third embodiment, but the configuration in which the photographing situation is determined by combining them may be adopted. More specifically, for example, when the ratio of the face area of a person in the screen is greater than or equal to a predetermined ratio, and a number of the shutter sounds detected in a predetermined period is greater than or equal to a predetermined number, the photographing situation may be determined as that of a photo session, and the visual line guiding function may be activated. Likewise, when the ratio of the face area of a person in a screen is greater than or equal to a predetermined ratio, and a specific sound is detected, the photographing situation may be determined as that of a photo session, and the visual line guiding function may be activated. Further, when a number of the shutter sounds detected in a predetermined period is greater than or equal to a predetermined number, and a specific sound is detected, the photographing situation may be determined as that of a photo session, and the visual line guiding function may be activated. Further, when the ratio of the face area of a person in the screen is greater than or equal to a predetermined ratio, a number of the shutter sounds detected in a predetermined period is greater than or equal to a predetermined number, and a specific sound is detected, the photographing situation may be determined as that of a photo session, and the visual line guiding function may be activated. In addition to the above mentioned embodiment, the processing of preventing competition described in the above described fourth embodiment may be further performed.

What is claimed is:

1. A photographing apparatus comprising:
a photographing lens;
an image acquisition device for acquiring an image of a subject;
a recording device for recording the image acquired in accordance with an instruction of actual photographing in a recording medium;
a visual line guiding device for guiding a visual line of the subject to the photographing lens;
a detection device for making detection of at least one of a ratio of a face of the subject in the image, an orientation of the face of the subject, a distance to the subject from the photographing apparatus, a moving amount of the subject, expression of the face of the subject, and a change amount of brightness of the subject in a predetermined time period, based on the image acquired by the image acquisition device; and
an activation control device for activating the visual line guiding device based on a result of the detection made by the detection device and based on a determination that at least one of said ratio, orientation, distance, moving amount, expression, and change amount satisfies a predetermined threshold value.

2. The photographing apparatus according to claim 1, wherein the activation control device activates the visual line guiding device when the at least one of requirements is satisfied, said requirements including the first requirement that the ratio of the face of the subject in the image is greater than or equal to a first threshold value, the second requirement that the orientation of the face of the subject is to a front of the photographing apparatus, the third requirement that the distance from the photographing apparatus to the subject is within a predetermined range, the fourth requirement that the moving amount of the subject is less than or equal to a second threshold value, the fifth requirement that the expression of the face of the subject is a smiling face, and the sixth requirement that the change amount of the brightness of the subject in the predetermined time period is greater than or equal to a third threshold value.

3. The photographing apparatus according to claim 1, wherein the detection device detects the ratio of the face of the subject in the image, the orientation of the face of the subject, the distance to the subject from the photographing apparatus, the moving amount of the subject, the expression of the face of the subject, and the change amount of brightness of the subject in the predetermined time period, and the activation control device activates the visual line guiding device when all of requirements is satisfied, said requirements including the first requirement that the ratio of the face of the subject in the image is greater than or equal to a first threshold value, the second requirement that the orientation of the face of the subject is to a front of the photographing apparatus, the third requirement that the distance from the photographing apparatus to the subject is within a predetermined range, the fourth requirement that the moving amount of the subject is less than or equal to a second threshold value, the fifth requirement that the expression of the face of the subject is a smiling face, and the sixth requirement that the change amount of the brightness of the subject in the predetermined time period is greater than or equal to a third threshold value.

4. A photographing apparatus comprising:
a photographing lens;
an image acquisition device for acquiring an image of a subject;
a recording device for recording the image acquired in accordance with an instruction of actual photographing in a recording medium;
a visual line guiding device for guiding a visual line of the subject to the photographing lens;
a shutter sound detection device for detecting a shutter sound occurring around the photographing apparatus; and
an activation control device for activating the visual line guiding device based on a result of he detection made by the shutter sound detection device and based on a determination that number of the shutter sounds detected by the shutter sound detection device within a predetermined time period is greater than or equal to a predetermined threshold value.

5. A photographing apparatus comprising:
a photographing lens;
an image acquisition device for acquiring an image of a subject;
a recording device for recording the image acquired in accordance with an instruction of actual photographing in a recording medium;
a visual line guiding device for guiding a visual line of the subject to the photographing lens;
a specific sound detection device for detecting a specific sound occurring around the photographing apparatus; and
an activation control device for activating the visual line guiding device based on a result of the detection made by the specific sound detection device and based on a determination that the detected specific sound satisfies a predetermined threshold value.

6. The photographing apparatus according to claim 1, further comprising:
a competition detection device for detecting the activation of a visual line guiding device comprised by another photographing apparatus,
wherein the activation control device stops activation of the visual line guiding device of the photographing apparatus when the competition detection device detects the activation of the visual line guiding device comprised by another photographing apparatus.

7. The photographing apparatus according to claim 4, further comprising:
a competition detection device for detecting the activation of a visual line guiding device comprised by another photographing apparatus,
wherein the activation control device stops activation of the visual line guiding device of the photographing apparatus when the competition detection device detects the activation of the visual line guiding device comprised by another photographing apparatus.

8. The photographing apparatus according to claim 5, further comprising:
a competition detection device for detecting the activation of a visual line guiding device comprised by another photographing apparatus,
wherein the activation control device stops activation of the visual line guiding device of the photographing apparatus when the competition detection device detects the activation of the visual line guiding device comprised by another photographing apparatus.

9. The photographing apparatus according to claim 6, wherein the visual line guiding device guides the visual line of the subject to the photographing lens by emitting a light of a predetermined color toward the subject, and
the competition detection device detects a hue of the image acquired by the image acquisition device, and detects the activation of the visual line guiding device comprised by another photographing apparatus based on the hue of the image.

10. The photographing apparatus according to claim 7, wherein the visual line guiding device guides the visual line of the subject to the photographing lens by emitting a light of a predetermined color toward the subject, and
the competition detection device detects a hue of the image acquired by the image acquisition device, and detects the activation of the visual line guiding device comprised by another photographing apparatus based on the hue of the image.

11. The photographing apparatus according to claim 8, wherein the visual line guiding device guides the visual line of the subject to the photographing lens by emitting a light of a predetermined color toward the subject, and
the competition detection device detects a hue of the image acquired by the image acquisition device, and detects the activation of the visual line guiding device comprised by another photographing apparatus based on the hue of the image.

12. A photographing method for photographing an image of a subject by a photographing apparatus, comprising steps of:
performing photographing preparation in accordance with an instruction of the photographing preparation;
making detection of at least one of a ratio of a face of the subject in the image, an orientation of the face of the subject, a distance to the subject from the photographing apparatus, a moving amount of the subject, expression of the face of the subject, and a change amount of brightness of the subject in a predetermined time period, based on the image acquired after receiving the instruction of the photographing preparation;

activating a visual line guiding device for guiding a visual line of the subject to a photographing lens comprised by the photographing apparatus based on a result of the detection and based on a determination that at least one of said ratio, orientation, distance, moving amount, expression, and change amount satisfies a predetermined threshold value;

acquiring the image of the subject in accordance with an instruction of actual photographing while the visual line guiding device is activated; and recording the image acquired in accordance with the instruction of the actual photographing in a recording medium.

13. The photographing method according to claim 12, wherein in the step of activating, the visual line guiding device is activated when the at least one of requirements is satisfied, said requirements including the first requirement that the ratio of the face of the subject in the image is greater than or equal to a first threshold value, the second requirement that the orientation of the face of the subject is to a front of the photographing apparatus, the third requirement that the distance from the photographing apparatus to the subject is within a predetermined range, the fourth requirement that the moving amount of the subject is less than or equal to a second threshold value, the fifth requirement that the expression of the face of the subject is a smiling face, and the sixth requirement that the change amount of the brightness of the subject in the predetermined time period is greater than or equal to a third threshold value.

14. The photographing apparatus according to claim 12, wherein in the step of making detection, the ratio of the face of the subject in the image, the orientation of the face of the subject, the distance to the subject from the photographing apparatus, the moving amount of the subject, the expression of the face of the subject, and the change amount of brightness of the subject in the predetermined time period are detected, and in the step of activating, the visual line guiding device is activated when all of requirements is satisfied, said requirements including the first requirement that the ratio of the face of the subject in the image is greater than or equal to a first threshold value, the second requirement that the orientation of the face of the subject is to a front of the photographing apparatus, the third requirement that the distance from the photographing apparatus to the subject is within a predetermined range, the fourth requirement that the moving amount of the subject is less than or equal to a second threshold value, the fifth requirement that the expression of the face of the subject is a smiling face, and the sixth requirement that the change amount of the brightness of the subject in the predetermined time period is greater than or equal to a third threshold value.

15. A photographing method for photographing an image of a subject by a photographing apparatus, comprising steps of:

performing photographing preparation in accordance with an instruction of the photographing preparation;

detecting a shutter sound occurring around the photographing apparatus;

activating a visual line guiding device for guiding a visual line of the subject to a photographing lens comprised by the photographing apparatus based on a result of the detection and based on a determination that a number of the shutter sounds detected within a predetermined time period is greater than or equal to a predetermined threshold value;

acquiring the image of the subject in accordance with an instruction of actual photographing while the visual line guiding device is activated; and recording the image acquired in accordance with the instruction of the actual photographing in a recording medium.

16. A photographing method for photographing an image of a subject by a photographing apparatus, comprising steps of:

performing photographing preparation in accordance with an instruction of the photographing preparation;

detecting a specific sound occurring around the photographing apparatus;

based on a result of the detection and based on a determination that the detected specific sound satisfies a predetermined threshold value;

acquiring the image of the subject in accordance with an instruction of actual photographing while the visual line guiding device is activated; and recording the image acquired in accordance with the instruction of the actual photographing in a recording medium.

17. The photographing method according to claim 12, further comprising steps of:

detecting the activation of a visual line guiding device comprised by another photographing apparatus before activating the visual line guiding device of the photographing apparatus; and stopping activation of the visual line guiding device of the photographing apparatus when the activation of the visual line guiding device comprised by another photographing apparatus is detected.

18. The photographing method according to claim 15, further comprising steps of:

detecting the activation of a visual line guiding device comprised by another photographing apparatus before activating the visual line guiding device of the photographing apparatus; and stopping activation of the visual line guiding device of the photographing apparatus when the activation of the visual line guiding device comprised by another photographing apparatus is detected.

19. The photographing method according to claim 16, further comprising steps of:

detecting the activation of a visual line guiding device comprised by another photographing apparatus before activating the visual line guiding device of the photographing apparatus; and stopping activation of the visual line guiding device of the photographing apparatus when the activation of the visual line guiding device comprised by another photographing apparatus is detected.

20. The photographing method according to claim 17, wherein in the step of activating, a light of a predetermined color is emitted toward the subject by the visual line guiding device to guide the visual line of the subject to the photographing lens, and in the step of detecting the activation, a hue of the acquired image is detected to detect the activation of the visual line guiding device comprised by another photographing apparatus based on the hue of the image.

21. The photographing method according to claim 18, wherein in the step of activating, a light of a predetermined color is emitted toward the subject by the visual line guiding device to guide the visual line of the subject to the photographing lens, and in the step of detecting the activation, a hue of the acquired image is detected to detect the activation of the visual line guiding device comprised by another photographing apparatus based on the hue of the image.

22. The photographing method according to claim 19, wherein in the step of activating, a light of a predetermined color is emitted toward the subject by the visual line guiding device to guide the visual line of the subject to the photographing lens, and in the step of detecting the activation, a hue of the acquired image is detected to detect the activation of the visual line guiding device comprised by another photographing apparatus based on the hue of the image.

* * * * *